(12) United States Patent
Nakagawa et al.

(10) Patent No.: US 6,519,513 B2
(45) Date of Patent: Feb. 11, 2003

(54) HYBRID VEHICLE CONTROL APPARATUS

(75) Inventors: Shinji Nakagawa, Hitachinaka (JP); Minoru Osuga, Hitachinaka (JP); Masami Nagano, Hitachinaka (JP); Hiroyuki Takamura, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/941,927

(22) Filed: Aug. 30, 2001

(65) Prior Publication Data

US 2002/0123831 A1 Sep. 5, 2002

(30) Foreign Application Priority Data

Mar. 1, 2001 (JP) ........................................ 2001-056428

(51) Int. Cl.$^7$ ................................................ G06F 7/00
(52) U.S. Cl. ......................................... 701/22; 701/108
(58) Field of Search ........................... 701/22, 108, 102, 701/109, 115

(56) References Cited

U.S. PATENT DOCUMENTS 5,359,519 A * 10/1994 Fehanno ..................... 701/108
6,434,474 B1 * 8/2002 Kotwicki et al. ........... 701/108

FOREIGN PATENT DOCUMENTS

| JP | 10288063 | 10/1998 |
| JP | 2000097063 | 4/2000 |

* cited by examiner

*Primary Examiner*—Richard M. Camby
(74) *Attorney, Agent, or Firm*—Crowell & Moring LLP

(57) ABSTRACT

A hybrid vehicle control apparatus which is capable of improving the deterioration of the emission performance unique to the hybrid vehicle during idle stop by purifying the exhaust gas remaining in the engine intake pipe, the cylinders, the exhaust pipe and the catalyst. The apparatus comprises two drive sources including an engine operated by fuel combustion and an electric motor/generator operated by electric energy. A residual exhaust gas purifier purifies the gas remaining in the intake pipe, the cylinders, the exhaust pipe and the catalyst of the engine.

19 Claims, 27 Drawing Sheets

<TARGET EGR RATE CALCULATION UNIT>

<TARGET THROTTLE OPENING DEGREE CALCULATION UNIT>

HYBRID VEHICLE CONTROL APPARATUS

BACKGROUND OF THE INVENTION

The present invention relates to a control apparatus for a hybrid vehicle comprising an engine and a motor, or in particular to a hybrid vehicle control apparatus intended to improve the residual exhaust gas condition when the vehicle is in idle stop.

A hybrid vehicle which uses both an engine and a motor doubling as a generator (motor/generator) as motive power is considered an effective means to cope with both the energy problem and the environmental problem. Specifically, in a hybrid vehicle having an engine and a motor/generator, the motor is rendered to function as a generator to regenerate energy when the engine works negatively at the time of deceleration, for example. As compared with the vehicle having only an engine as motive power, therefore, the fuel efficiency is improved. Also, when the vehicle is stationary, the idling of the engine is prohibited. Further, when the engine is restarted, the revolution speed is increased by the motor to a rpm at which the engine can work independently, after which the engine is supplied with fuel to start fuel combustion. As a result, the unnecessary fuel consumption at the time of idling can be suppressed on the one hand, and the exhaust gas can be reduced at the time of starting on the other hand. In the hybrid vehicle, as described above, the engine and motor are controlled in collaboration with each other, and therefore both the fuel consumption and the exhaust gas can be improved as compared with the vehicle having only an engine.

At the time of what is called the idle stop when the engine stops as vehicle stops, on the other hand, the problem is posed of a deteriorated exhaust gas unique to the hybrid vehicle. Specifically, at the time of idle stop, the engine is stopped abruptly, and therefore the exhaust gas component remaining especially in the catalyst is adsorbed to the precious metal in the catalyst and may temporarily deteriorate the purification performance of the catalyst. When the vehicle is restarted, therefore, the problem is encountered that the residual gas is released out of the vehicle without sufficiently purifying the gas in the catalyst.

In order to obviate this problem, JP-A-10-288063 provides a technique for an apparatus which executes the operation with motor at the time of idling, while the idling of the engine is carried out when the catalyst temperature decreases below the activation temperature. On the other hand, JP-A-2000-97063 provides a technique for an apparatus in which the catalyst temperature, if lower than the activation temperature at the time of idle stop, is increased to the activation temperature.

The problem of the deteriorated exhaust gas unique to the hybrid vehicle which occurs at the time of idle stop is caused, as described above, by the fact that the abrupt engine stop leaves the exhaust gas in the engine intake pipe, the cylinders, the exhaust pipe and the catalyst, and these residual gases are released out of the vehicle without being sufficiently purified by the catalyst when the engine is restarted. Some action is required to prevent this situation.

The present inventor has acquired a new knowledge that a means for purifying the residual gas is required in the process between the intake pipe and the catalyst for obviating the aforementioned problem of the residual gas deterioration caused by idle stop. The conventional technique described above, however, is intended to prevent the catalyst temperature from decreasing below the active temperature by engine stop and includes no means for purifying the residual gas.

SUMMARY OF THE INVENTION

The present invention has been achieved in view of the problem described above, and the object thereof is to provide a hybrid vehicle control apparatus which can improve the exhaust gas deterioration unique to the hybrid vehicle in idle stop by purifying the exhaust gas remaining in the engine intake pipe, the cylinders, exhaust pipe and the catalyst.

In order to achieve the object described above, according to one aspect of the present invention, there is provided a control apparatus for a hybrid vehicle supplied with motive power by an engine operated by fuel combustion on the one hand and an electric motor/generator operated by electric energy on the other, the control apparatus comprising residual exhaust gas purification means for purifying the gas remaining in the intake pipe, cylinders, exhaust pipe and the catalyst of the engine.

In the hybrid vehicle control apparatus according to this invention having the configuration described above, as shown in FIG. 1, the gas remaining in the portions on the way from the intake pipe to the catalyst is purified by the residual exhaust purification means, and therefore the residual exhaust gas condition at the time of idle stop can be improved.

According to another aspect of the invention, there is provided a hybrid vehicle control apparatus specifically comprising, as shown in FIG. 2, accelerator pedal angle determining means for determining whether the accelerator pedal angle is not more than a predetermined value or not, wherein the residual exhaust gas purification means purifies the residual gas based on the output signal of the accelerator pedal angle determining means.

According to still another aspect of the invention, there is provided a hybrid vehicle control apparatus specifically comprising, as shown in FIG. 3, engine revolution means, which outputs, in the case where the fuel injection to the engine stops, a signal for rotating the engine by a force other than the explosion by combustion, based on the output signal from the residual exhaust gas purification means.

According to yet another aspect of the invention, there is provided a hybrid vehicle control apparatus,
  wherein the engine revolution means rotates the engine by the turning effort of the electric motor/generator as shown in FIG. 4,
  wherein the engine revolution means rotates the engine by the energy required for deceleration of the axle of the vehicle as shown in FIG. 5,
  wherein the engine, the electric motor/generator, the transmission and the axle are connected in that order, and a clutch is interposed between the engine and the electric motor/generator, and the engine revolution means being adapted to rotate the engine through the axle by engaging the clutch for a predetermined time length in the case where the required drive force of the vehicle is not more than zero and the vehicle is decelerating, as shown in FIG. 6,
  wherein the engine, the electric motor/generator, the transmission and the axle are connected in that order, and a clutch is interposed at least between the electric motor/generator and the transmission, the engine revolution means being adapted to disengage the clutch and rotate the engine by the electric motor/generator when the vehicle is stationary, as shown in FIG. 7, or
  wherein the electric motor/generator, the engine, the transmission and the axle are connected in that order, and a clutch is interposed between the engine and the transmission, the engine revolution means being adapted to disengage the clutch and rotate the engine by the electric motor/generator when the vehicle is stationary, as shown in FIG. 8.

According to a further aspect of the invention, there is provided a hybrid vehicle control apparatus comprising:

control execution period calculation means for calculating the period of controlling the purification of the residual gas through the residual exhaust gas purification means based on the operating conditions of the engine or the electric motor/generator, the control execution period calculation means being adapted to calculate the control execution period based on the amount of air flowing into the engine;

wherein the engine includes catalyst upstream exhaust gas component detection means for detecting, directly or indirectly, the exhaust component upstream of the catalyst, the control execution period calculation means being adapted to calculate the control execution period based on the signal produced from the catalyst upstream exhaust gas component detection means;

wherein the engine includes catalyst downstream exhaust gas component detection means for detecting, directly or indirectly, the exhaust gas component downstream of the catalyst, the control execution period calculation means being adapted to calculate the control execution period based on the signal produced from the catalyst downstream exhaust gas component detection means;

wherein the engine includes a throttle valve for regulating the amount of air flowing into the engine, the throttle valve being adapted to open full during the period of controlling the purification of the residual gas through the residual exhaust gas purification means;

wherein the engine includes an exhaust gas reflux amount regulation valve for regulating the amount of exhaust gas reflux of the engine, the exhaust gas reflux amount regulation valve being adapted to be closed up during the period of controlling the purification of the residual gas through the residual exhaust gas purification means; or wherein the engine includes a throttle valve for regulating the amount of air flowing into the engine, and the opening degree of the throttle valve and the rotational speed of the electric motor/generator are controlled to maximize the purification efficiency of the catalyst during the period of controlling the exhaust gas purification through the residual exhaust gas purification means.

According to a still further aspect of the invention, there is provided a hybrid vehicle control apparatus comprising an engine having a throttle valve for regulating the amount of air flowing into the engine;

wherein the opening degree of the throttle valve is controlled to maximize the purification efficiency of the catalyst during the period of controlling the purification of the residual gas through the residual exhaust gas purification means;

wherein, the vehicle having a battery for the motor/generator, the rotational speed of the motor/generator is determined in accordance with the storage amount of the battery;

wherein, the vehicle having a battery for the motor/generator, the control operation for purifying the residual gas by the residual exhaust gas purification means is prohibited in the case where the storage amount of the battery is not higher than a predetermined value; or wherein, the vehicle having a battery for the motor/generator, the idle stop is prohibited and the engine is caused to idle in the case where the battery storage amount is not higher than a predetermined value.

DETAILED DESCRIPTION OF THE EMBODIMENTS

A hybrid vehicle control apparatus according to each embodiment of the invention will be explained below with reference to the drawings.
(First embodiment)

Figure 1:
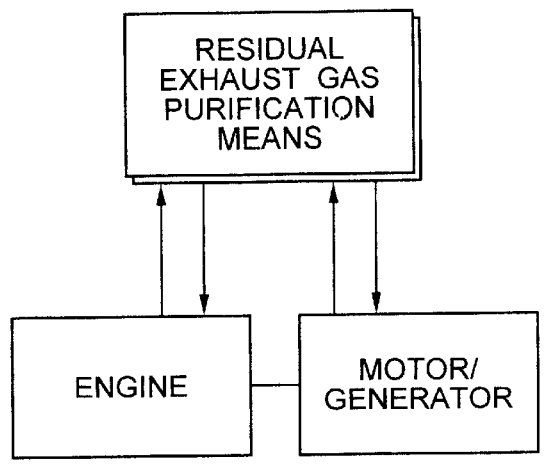
FIG. 1 is a block diagram showing a hybrid vehicle control apparatus according to a first aspect of the invention.
Figure 2:
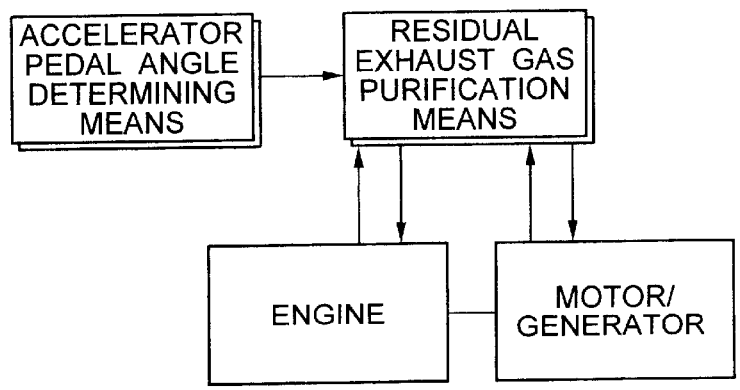
FIG. 2 is a block diagram showing a hybrid vehicle control apparatus according to a second aspect of the invention.
Figure 3:
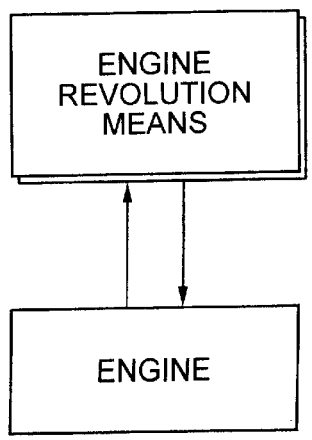
FIG. 3 is a block diagram showing a hybrid vehicle control apparatus according to a third aspect of the invention.
Figure 4:
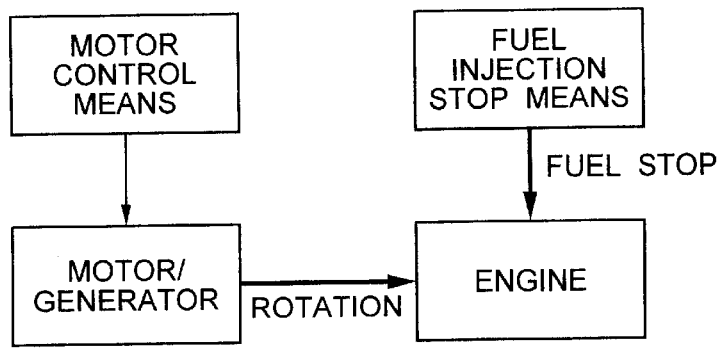
FIG. 4 is a block diagram showing a hybrid vehicle control apparatus according to a fourth aspect of the invention.
Figure 5:
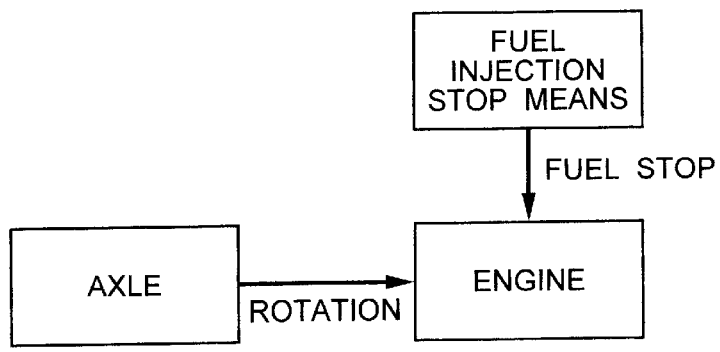
FIG. 5 is a block diagram showing a hybrid vehicle control apparatus according to a fifth aspect of the invention.
Figure 6:
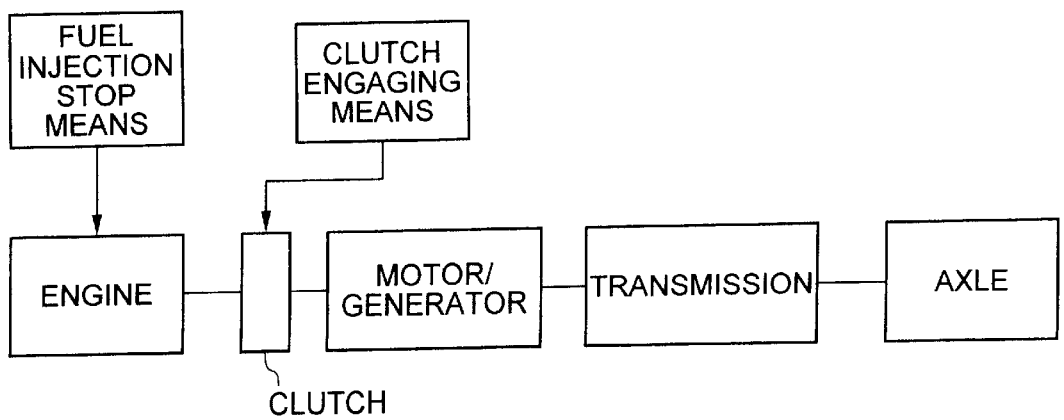
FIG. 6 is a system diagram showing a hybrid vehicle according t,o a sixth aspect of the invention.
Figure 7:
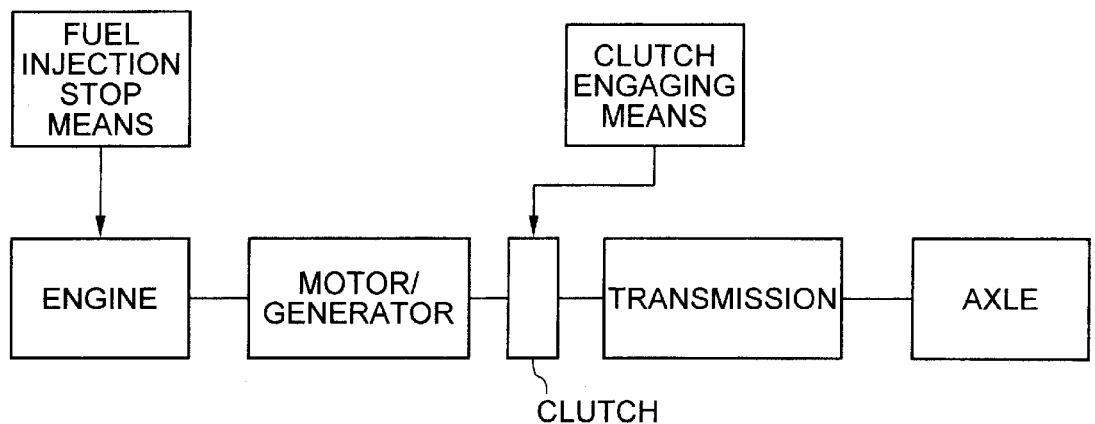
FIG. 7 is a system diagram showing a hybrid vehicle according to a seventh aspect of the invention.
Figure 8:
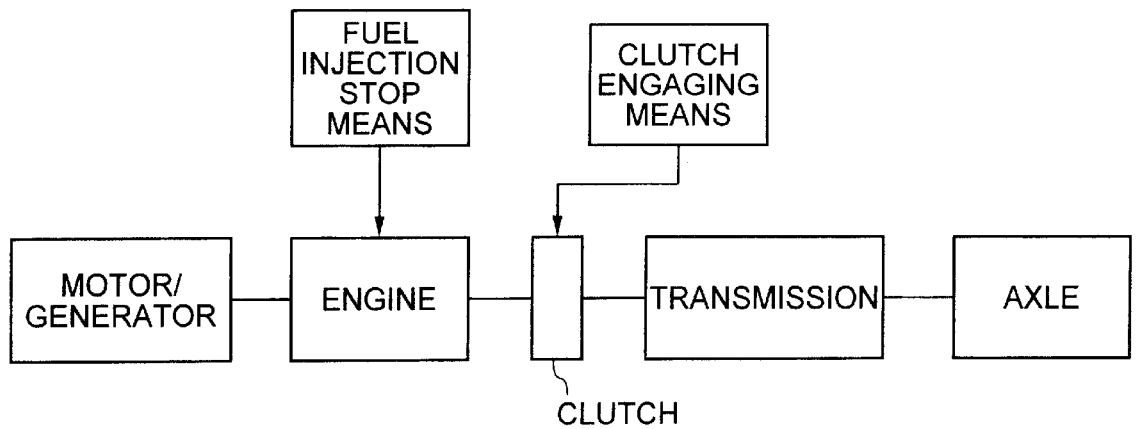
FIG. 8 is a system diagram showing a hybrid vehicle according to an eighth aspect of the invention.
Figure 9:
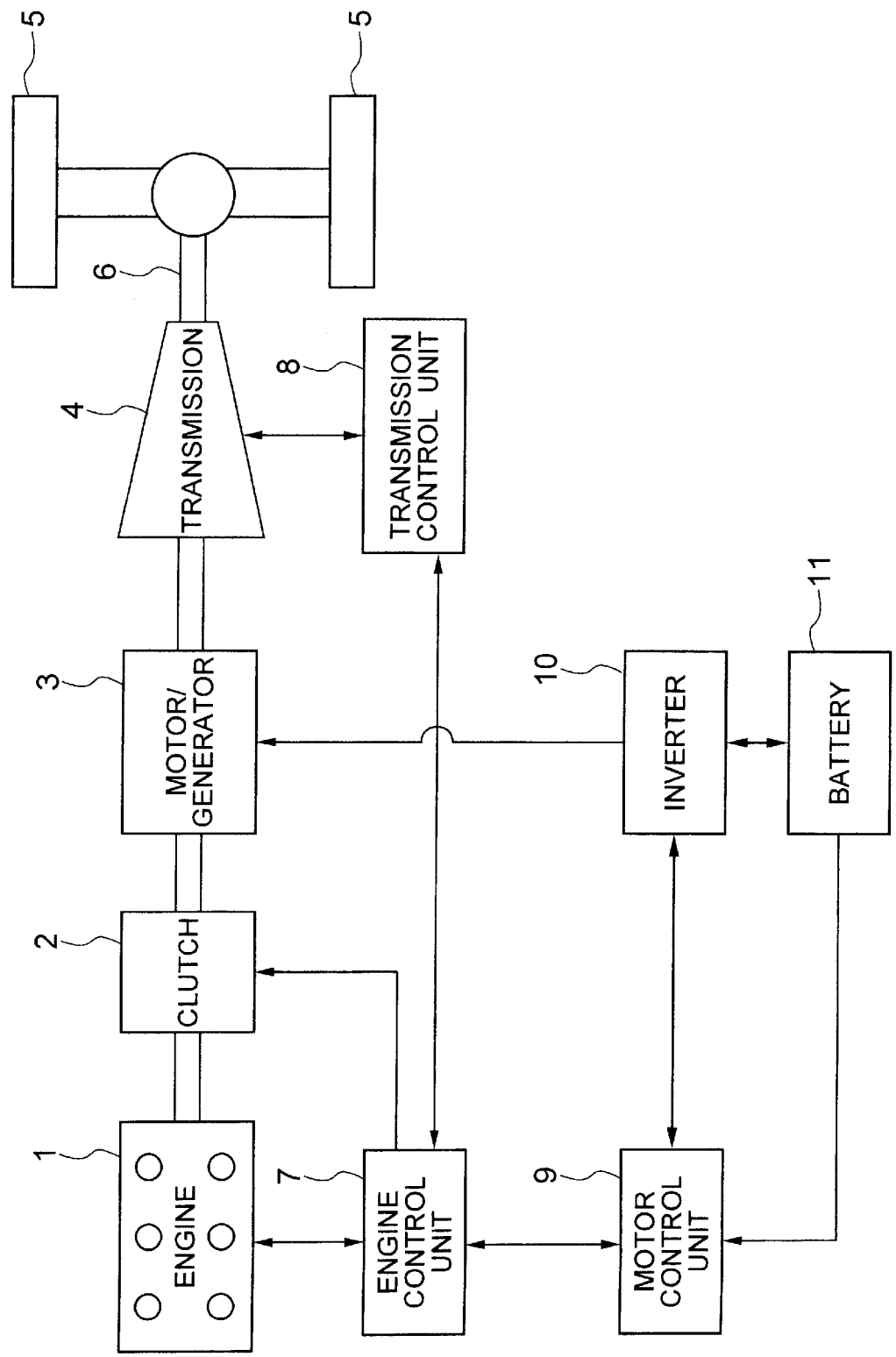
FIG. 9 is a system diagram showing a hybrid vehicle according to a first embodiment of the invention.

FIG. 9 is a system diagram showing a hybrid vehicle according to a first embodiment. This system represents a specific case of embodying the invention described in claim 6.

The hybrid vehicle comprises two prime movers including an engine 1 using the fuel combustion pressure as motive power and an electric motor doubling as a generator 3 using electric energy as motive power. An electronically controlled clutch 2 is interposed between the engine 1 and the electric motor/generator 3.

The electric energy supplied from a battery 11 is supplied to the motor/generator 3 through an inverter 10. The motive power of the engine 1 and the motor 3 is converted into an appropriate torque through a transmission 4 and transmitted to tires 5 as a vehicle driving force through a vehicle drive axle 6. The gear ratio is controlled appropriately by a transmission control unit 8.

In accordance with the operating conditions, for example, at the time of vehicle deceleration, the motive power of the vehicle is transmitted to the motor/generator 3 and electric power is generated in the motor 3. The electric energy thus generated is stored in the battery 11.

As described above, the motor/generator 3 has dual function of assisting with drive force and power generation. Which of two functions to be used is controlled by the motor control unit 9 in accordance with the vehicle operating conditions. The operating conditions of the engine 1, on the other hand, are controlled by the engine control unit 7.

Various information are transmitted by data communication between the engine control unit 7, the transmission control unit 8 and the motor control unit 9, so that the engine control unit 7, the transmission control unit 8 and the motor control unit 9 are controlled in collaboration with each other to optimize the operating conditions of the engine 1, the transmission 4 and the motor/generator 3.

Figure 10:
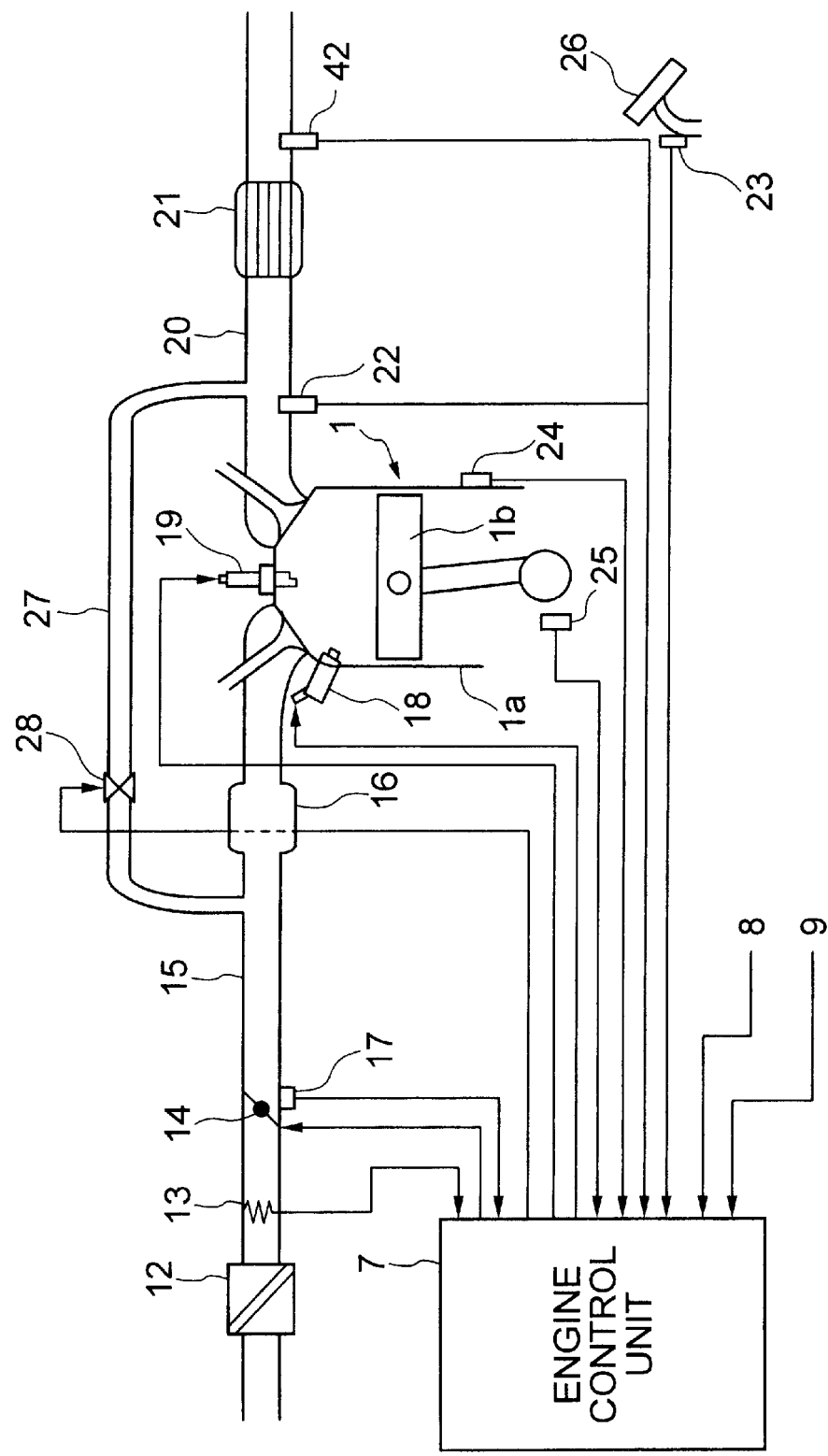
FIG. 10 is a system diagram showing an engine according to first to 11th embodiments of the invention.

FIG. 10 is a system diagram showing the engine 1.

In the engine 1 configured of multiple cylinders, the air from an external source is passed through an air cleaner 12 and further through an intake manifold 15 and a collector 16, flows into a cylinder 1a.

The influent air amount regulated by a throttle valve (electronic throttle) 14 is detected by an air flow sensor 13, and the opening degree of the electronic throttle 14 is detected by a throttle valve opening degree sensor 17. An engine speed sensor 25 outputs a signal for each degree of the rotational angle of the crankshaft. A water temperature sensor 24 detects the temperature of the cooling water for the engine 1. An accelerator pedal angle sensor 23 detected the stroke of the accelerator pedal 26, and based on this, detects the torque required by the driver.

The signals from the accelerator pedal angle sensor 23, the air flow sensor 13, the throttle valve opening degree sensor 17, the engine speed sensor 25 and the water temperature sensor 24 are sent to the engine control unit 7. The operating conditions of the engine 1 are acquired from the outputs of these sensors thereby to calculate the optimum amounts of the main operations of the engine 1 such as the air amount, the fuel injection amount and the ignition timing. The fuel injection amount thus calculated is converted into a valve open pulse signal and sent to a fuel injection valve 18, while the ignition timing is converted into an ignition drive signal and sent to a spark plug 19.

The fuel injected from the fuel injection valve 18 is mixed with the air from the intake manifold 15 and, flowing into the cylinder 1a of the engine 1, forms a mixture gas. This mixture gas is exploded by a spark generated from the spark plug 19 at a predetermining ignition timing, and the resulting combustion pressure pushes down the piston 1b to generate the motive power for the engine 1.

The exhaust gas after explosion is sent into a three-way catalyst through an exhaust manifold 20, and after the exhaust components HC, CO and NOx are purified, released out of the vehicle. Part of the exhaust gas, on the other hand, is recirculated to the intake side through an exhaust gas reflux pipe 27. The amount of the reflux is controlled by an exhaust gas reflux amount regulation valve 28.

An A/F sensor 22 which is a form of the catalyst upstream exhaust gas component detection means is mounted between the engine 1 and the three-way catalyst 21 and has an output characteristic linear with respect to the oxygen concentration of the exhaust gas. The relation between the oxygen concentration of the exhaust gas and the air-fuel ratio is substantially linear, and therefore the air-fuel ratio can be determined by the A/F sensor 22 for detecting the oxygen concentration. An O2 sensor 42 which a form of the catalyst downstream exhaust component detection means is mounted downstream of the three-way catalyst 21 and has a rich-lean two-valued output characteristic with respect to the stoichiometric air-fuel ratio.

The engine control unit 7 performs the F/B control operation, in which the air-fuel ratios upstream and downstream of the three-way catalyst 21 are calculated from the signals of the A/F sensor 22 and the O2 sensor 42, and the fuel injection amount and the air amount are corrected as required to achieve a target air-fuel ratio of the mixture gas in the cylinder 1a.

Figure 11:
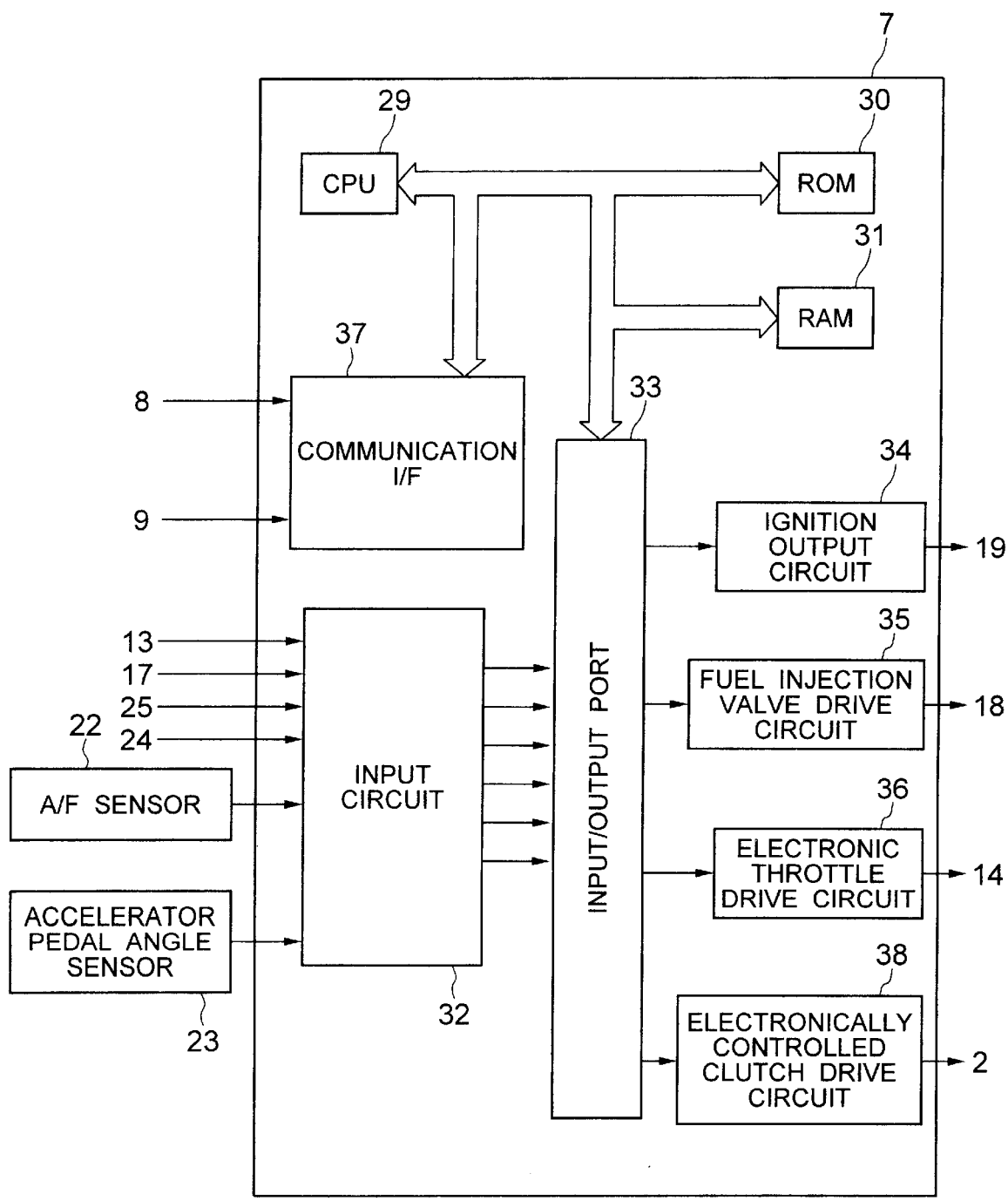
FIG. 11 is a diagram showing an internal configuration of an engine control unit according to the first to 11th embodiments of the invention.

FIG. 11 is a diagram showing an internal configuration of the engine control unit 7.

The engine control unit 7 is supplied with the output values from the A/F sensor 22, the accelerator pedal angle sensor 23, the throttle valve opening degree sensor 17, the air flow sensor 13, the engine speed sensor 25, the water temperature sensor 23 and the O2 sensor 42, which output values, after removing noises or otherwise processing the signals in the input circuit 32, are sent to the input/output port 33.

The value of the input port is held in the RAM 31 and arithmetically processed in the CPU 29. The control program describing the contents of the arithmetic processing is written beforehand in the ROM 30. The values representing the amount of operation of each actuator calculated in accordance with the control program are stored in the RAM 31, and sent to the input/output port 33. As an operating signal for the spark plug 19 used for starting a spark for combustion, an on/off signal is set in the input/output port 33. The on/off signal is adapted to turn on when a current flows in the primary coil of the ignition output circuit 34 and turn off when no such current flows. The ignition timing occurs when the on/off signal turns off. The signal for the spark plug 19 set in the input/output port 33 is amplified to a sufficient energy level for combustion in the ignition output circuit 34 and supplied to the spark plug 19.

As a drive signal for the fuel injection valve 18, on the other hand, an on/off signal adapted to turn on when opening the valve and turn off when closing the valve is set in the input/output port 33, and after being amplified to a sufficient energy level to open the fuel injection valve 18 by the fuel injection valve drive circuit 35, sent to the fuel injection valve 18.

The drive signal for realizing the target opening degree of the electronic throttle valve 14 is sent to the electronic throttle valve 14 through an electronic throttle valve drive circuit 36, while the on/off signal for the electronically controlled clutch 2 is sent to the clutch 2 through a clutch drive circuit 38.

The engine control unit 7 includes an interface 37 for allowing communication of various data between the motor control unit 9 and the transmission control unit 8, thereby making possible the control operation in collaboration with the motor 3 and the transmission 4.

The control program for the engine control unit 7 and the motor control unit 9 will be explained below.

Figure 12:
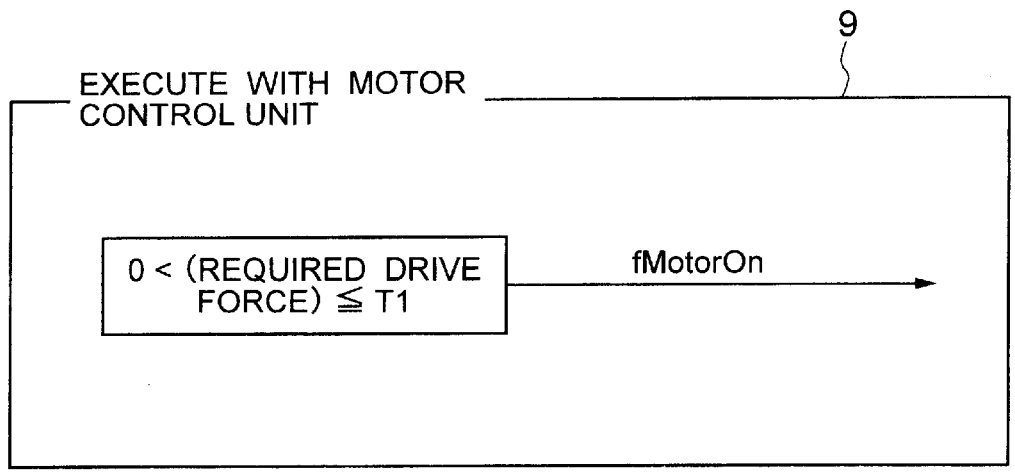
FIG. 12 is a block diagram showing the motor drive permit control operation performed in a motor control unit shown in FIG. 9.

FIG. 12 shows the process performed in the motor control unit 9. In the case where the required drive force is not smaller than zero and not more than a predetermined value T1, fMotorOn is regarded as 1, and the motor/generator 3 is driven. The required drive force is preferably determined from the accelerator pedal angle, etc.

Figure 13:
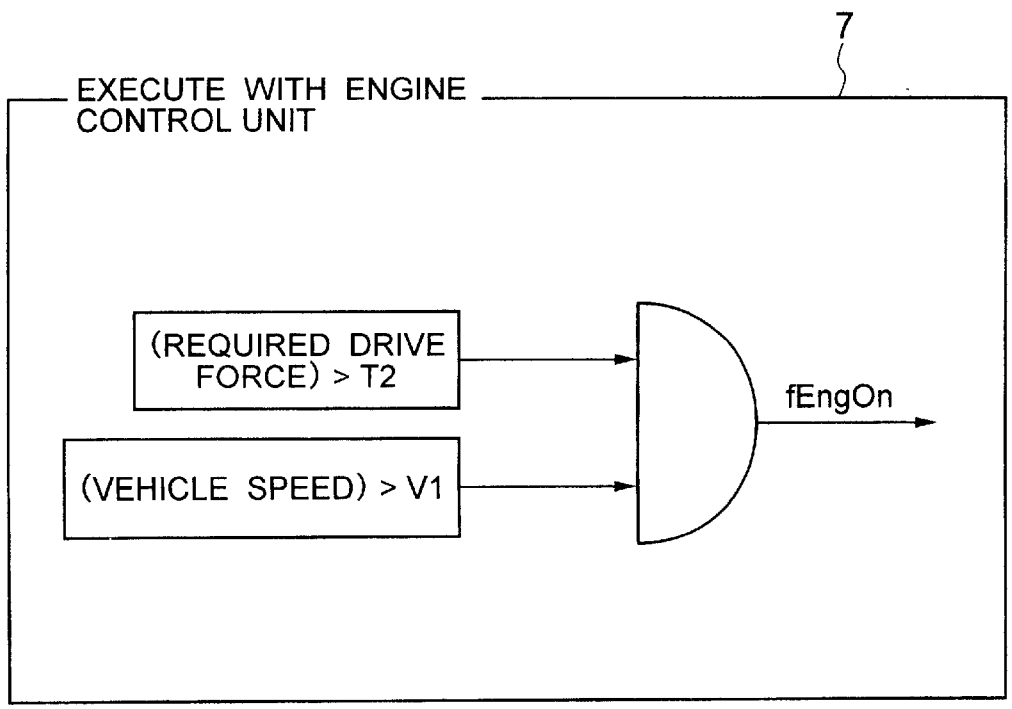
FIG. 13 is a block diagram showing the engine drive permit control operation performed in an engine control unit shown in FIG. 9.

FIG. 13 shows the process performed in the engine control unit 7. In the case where the required drive force is larger than a predetermined value T2 and the vehicle speed is higher than a predetermined value V1, fEngOn is regarded as 1, and the engine is started. At the time of deceleration, on the other hand, fEngOn is regarded as 0, and the fuel injection into the engine 1 is stopped. Though not specifically described here, the torque of the motor 3 and the engine 1 are controlled according to the motor current and the fuel injection amount, the air amount and the ignition timing of the engine 1 to realize the required drive force described above.

Figure 14:
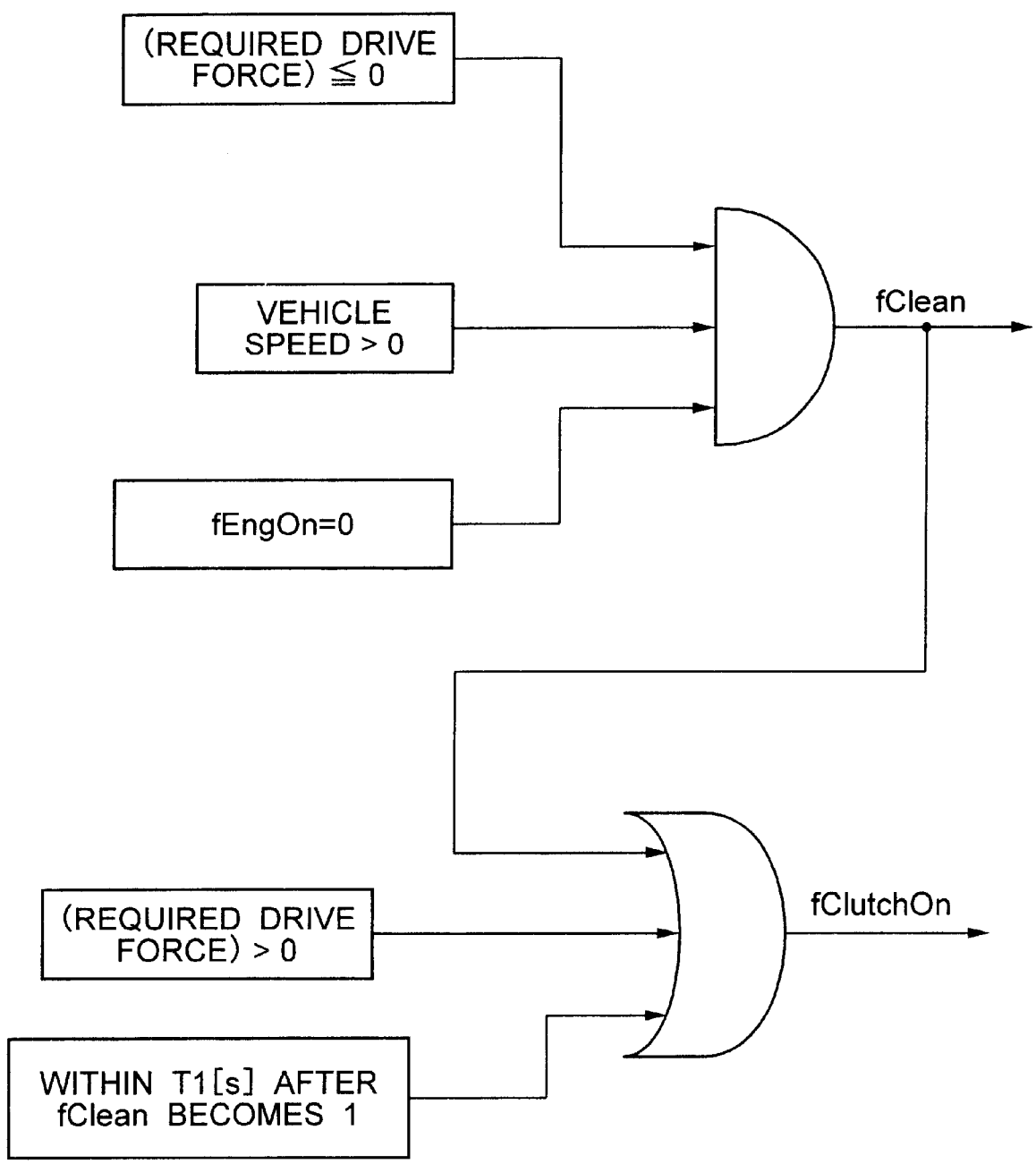
FIG. 14 is a block diagram showing the operation of controlling the purification of the residual exhaust gas by the residual exhaust gas purification means and the operation of controlling the clutch engagement by the engine revolution means according to the embodiment of FIG. 9.

FIG. 14 is a control block diagram of scavenging for purifying the residual gas through the residual exhaust gas purification means according to this embodiment.

The residual exhaust gas purification means is arranged in the control units and basically operates to purify the gas remaining in the various component parts of the engine 1 ranging from the intake pipe 15 to the catalyst 21, or specifically, the gas remaining in the intake pipe 15, the cylinder 1a, the exhaust pipe 20 and the catalyst 21, based on the conditions of the engine 1 and the motor/generator 3. This operation can be performed, as described later, in such a manner that the engine revolution means for rotating the engine 1 by a motive power other than the fuel combustion disengages or engages the clutch, and rotates the engine 1 by the turning effort derived from the various configurations of the electric motor/generator 3, the vehicle drive axle 6, etc., based on the output signals from the residual exhaust gas purification means of the control units 7 and 9. In other words, during the period of purification by the residual exhaust gas purification means, the engine 1 is rotated by other than the explosive force of combustion, and fresh air is thereby sent into the engine 1 thereby to remove the exhaust gas remaining in the intake pipe 15, the engine 1, the exhaust pipe 20 and the catalyst 21. In this way, the gas is purified through the catalyst 21. As described later, the engine revolution means is also arranged in each control unit.

In this embodiment, assume that the accelerator pedal angle determining means arranged in the control unit 7 having the residual exhaust gas purification means and the engine revolution means determines that the angle of the accelerator pedal 26 is lower than a predetermined value or otherwise it is determined that the engine 1 is not required to perform a positive work, so that the required drive force is reduced to not higher than 0, the vehicle speed is larger than 0 and the fEngOn is 0 indicating the deceleration. Then, the fuel injection into the engine 1 is stopped, and the residual exhaust gas purification control permit flag fClean is set to 1 in the residual exhaust gas purification means thereby to allow the residual gas to be purified. In the case where fClean=1, the engine revolution means sets the clutch engagement permit flag fClutchOn to 1. In this way, the clutch 2 is allowed to engage, and actually engages, while the engine 1 to which the deceleration force is transmitted by the signal from the engine revolution means rotates without any load. In other words, according to this embodiment, the clutch 2 interposed between the engine 1 and the motor 3 remains engaged at the time of deceleration, and the engine 1 is rotated by part of the energy required for deceleration transmitted reversely from the vehicle drive axle 6, so that the residual gas can be removed by scavenging from the engine 1 and purified by the catalyst 21.

In the case where the required drive force increases beyond 0 or within T1[s] from the time when fClean is set to 1, the flag fClutchOn is set to 1 to engage the clutch 2 and start the engine 1.

Figure 15:
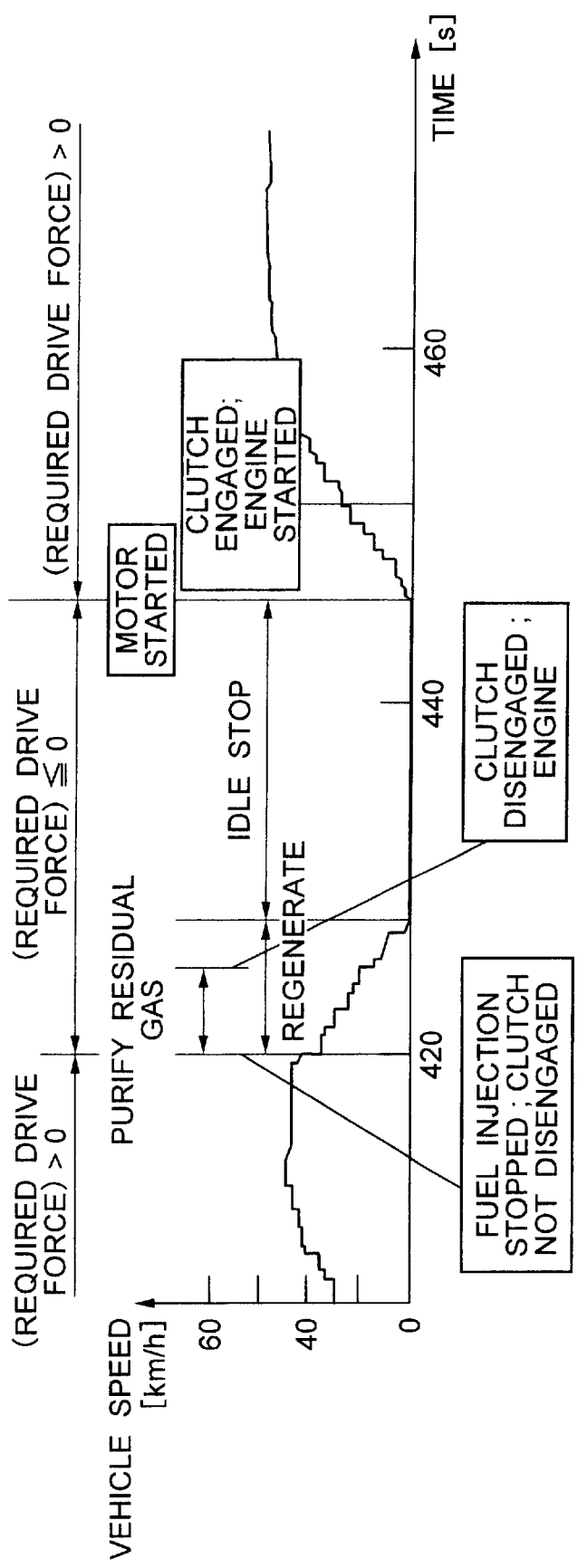
FIG. 15 is a chart for the process of operating a hybrid vehicle according to the embodiment shown in FIG. 9.

FIG. 15 is a chart for the process of operating the hybrid vehicle according to this embodiment.

As shown in FIG. 15, in the case where the required drive force is larger than 0, the engine 1 and the motor 3 are used to drive the vehicle. At the time of deceleration with the required drive force not larger than 0 and the vehicle speed not lower than 0, however, the motor/generator 3 is used as a generator so that the battery 11 is charged (power is regenerated) while decelerating the vehicle. At the same time, the turning effort of the axle 6 is transmitted to the engine 1 with the clutch 2 engaged, thereby purifying the residual gas by scavenging. After that, the clutch 2 is disengaged and the engine is stopped into the idle stop mode.

Upon termination of the idle stop by starting the motor 3, the vehicle is driven only by the drive force of the motor 3. In the case where the required drive force exceeds 0, the clutch 2 is engaged and the engine 1 is started. The purification control time T1 can be determined in accordance with the actual vehicle performance.

(Second Embodiment)

Figure 16:
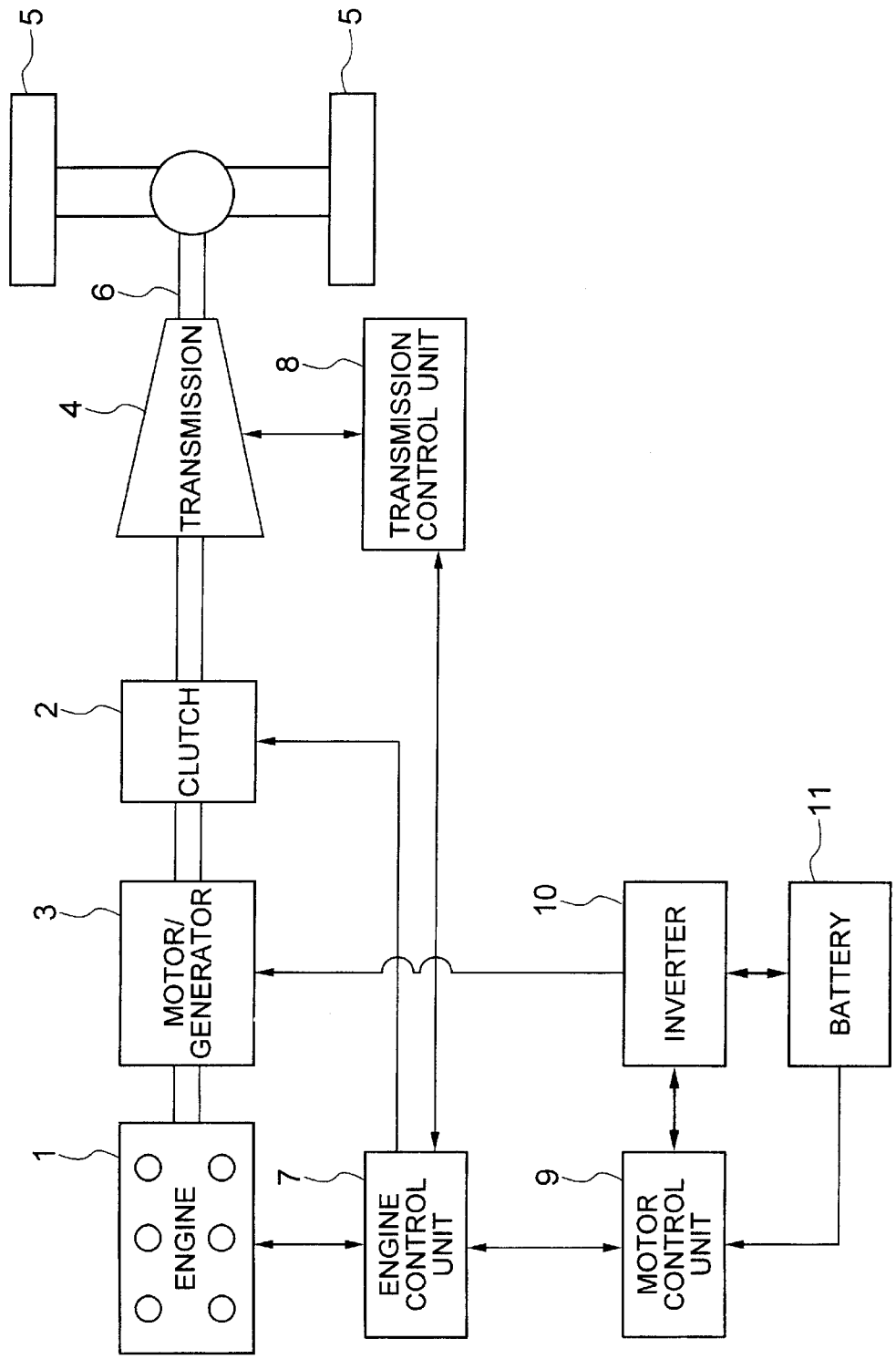
FIG. 16 is a system diagram showing a hybrid vehicle according to a second embodiment of the invention.

FIG. 16 is a system diagram showing a hybrid vehicle according to a second embodiment of the invention. This hybrid vehicle represents a specific case of the invention according to claim 7. In this embodiment, as compared with the first embodiment, the position of the clutch 2 is different, while the other points are identical. The difference will be explained.

Specifically, an electronically controlled clutch 2 is interposed between the electric motor/generator 3 and the transmission 4. The internal configuration (FIG. 11) of the engine system (FIG. 10) and the engine control unit 7 is similar to those of the first embodiment.

The control program of the engine control unit 7 and the motor control unit 9 will be explained below.

Figure 17:
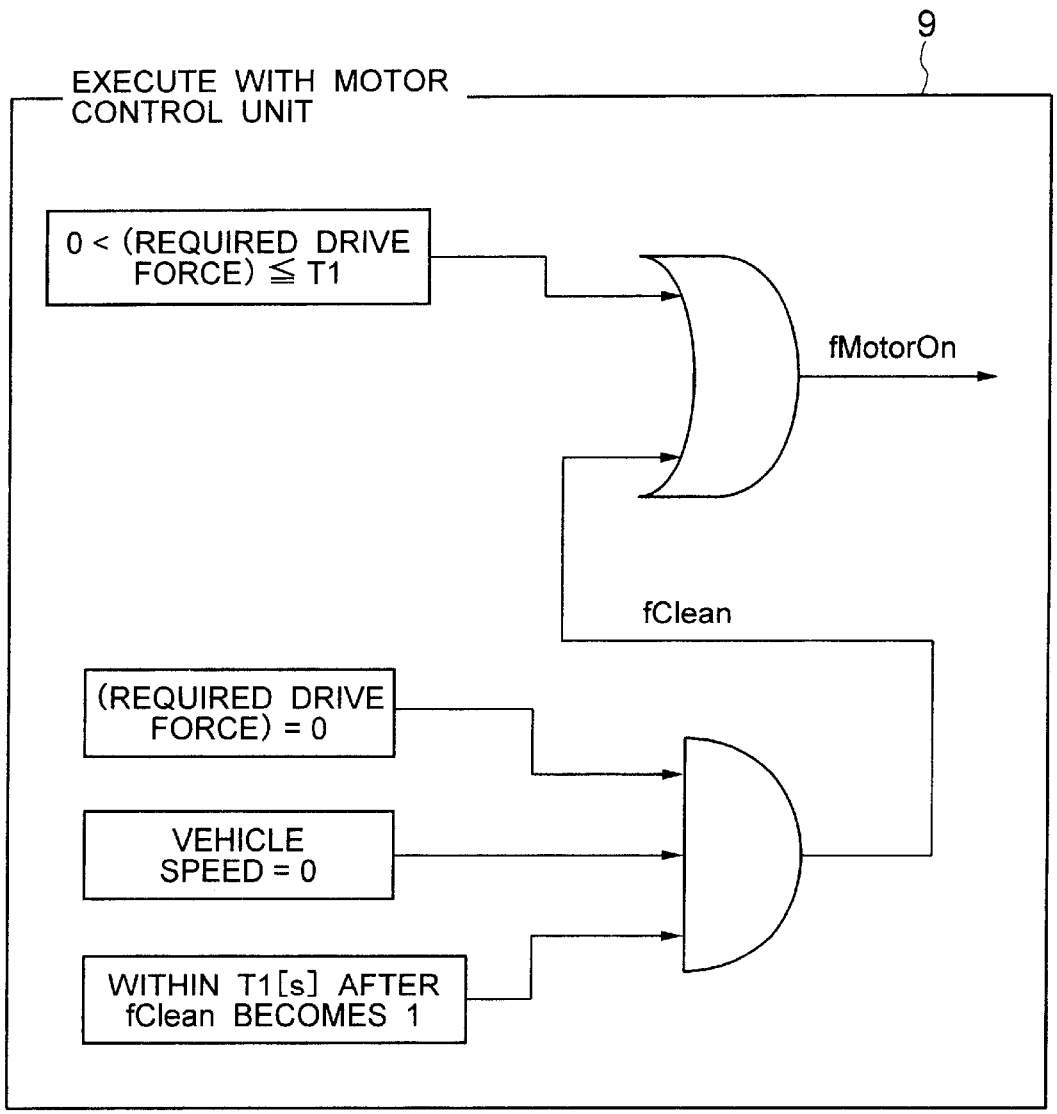
FIG. 17 is a block diagram showing the operation of controlling the purification of the residual exhaust gas by the residual exhaust gas purification means and the motor drive permit control operation by the engine revolution means according to the embodiment of FIG. 16.

FIG. 17 shows the process of the operation performed in the motor control unit 9. Assume that the vehicle has residual exhaust gas purification means and the engine revolution means and the required drive force is not less than 0 and not more than a predetermined value T1, or the residual exhaust gas purification control permit flag fClean=1 in the residual exhaust gas purification means. Then, the engine revolution means sets the motor drive permit flag fMotorOn to 1 so that the motor 3 is allowed to be driven, and the motor/generator 3 is driven. The required drive force is preferably determined normally to optimize the purification efficiency, as described later normally, when the accelerator pedal angle or the residual exhaust gas purification is being controlled, i.e. when fclean=1.

The residual exhaust gas purification control permit flag fClean assumes 1 in the case where the required drive force is 0, the vehicle speed is 0 and within T1[s] after the flag fClean is set to 1.

Figure 18:
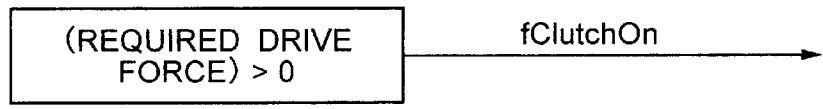
FIG. 18 is a block diagram showing the operation of controlling the clutch engagement performed in an engine control unit shown in FIG. 16.

FIG. 18 shows the process of the operation performed in the engine control unit 7. In the case ere the required drive force is larger than a predetermined value T2 and the vehicle speed is larger than a predetermined value V1, the flag fEngOn is set to 1 to start the engine 1. At the time of deceleration, the flag fEngOn becomes 0 and the fuel injection is stopped as in the first embodiment.

When fClean=1, the clutch 2 is disengaged, and the engine 1 is driven without load by the electric motor/generator 3 in accordance with the signal from the engine revolution means. Specifically, according to this embodiment, the clutch 2 interposed between the motor 3 and the transmission 4 is disengaged when the vehicle is stationary, so that the engine 1 is rotated by the force of the motor 3. In this way, fresh air is blown into the engine 1 thereby to remove the residual gas by scavenging from the engine 1 and purify it with the catalyst 21. As shown in FIG. 18, in the case where the required drive force is larger than 0, fClutchOn is set to 1 so that the clutch 2 is engaged to start the engine 1.

Figure 19:
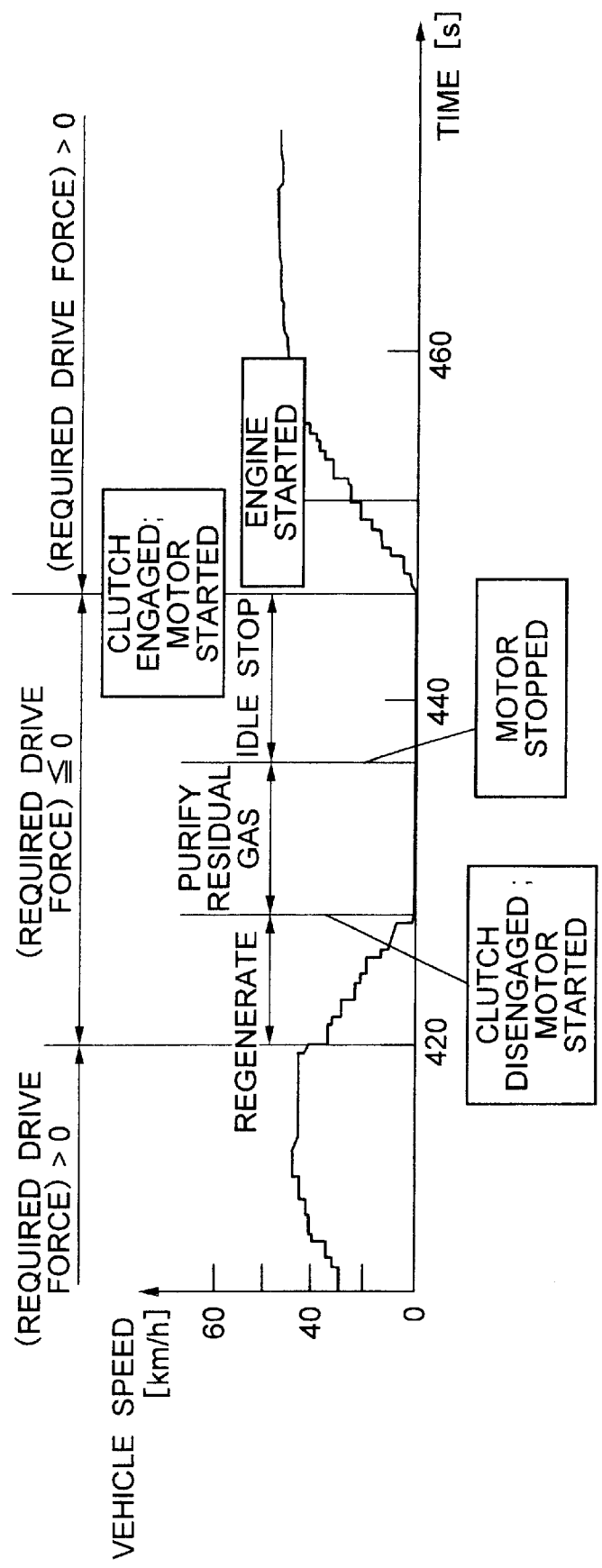
FIG. 19 is a chart for the process of controlling a hybrid vehicle according to the embodiment shown in FIG. 16.

FIG. 19 is a chart of the process for operating the hybrid vehicle according to this embodiment.

As shown in FIG. 19, as long as the required drive power is larger than 0, the engine 1 and the motor 3 are used to drive the vehicle. In the case where the required drive force is not larger than 0 and the vehicle speed is reduced to 0 but the vehicle is decelerated, on the other hand, the motor/generator 3 is used as a generator and the battery 11 is charged (power is regenerated) while the vehicle is decelerated. When the vehicle speed becomes 0, the clutch 2 is disengaged, so that the turning effort of the motor 3 is transmitted to the engine 1 thereby to purify the residual gas by scavenging. After that, the motor 3 is stopped while at the same time stopping the engine 1 into the idle stop mode.

In the case where the required drive force exceeds 0, the clutch 2 is engaged while at the same time starting the motor 3 thereby to terminate the idle stop mode. The vehicle thus starts to run with the drive force of the power 3, followed by starting the engine 1. The execution time 1 of controlling the purification can be determined in accordance with the actual vehicle performance.

(Third Embodiment)

Figure 20:
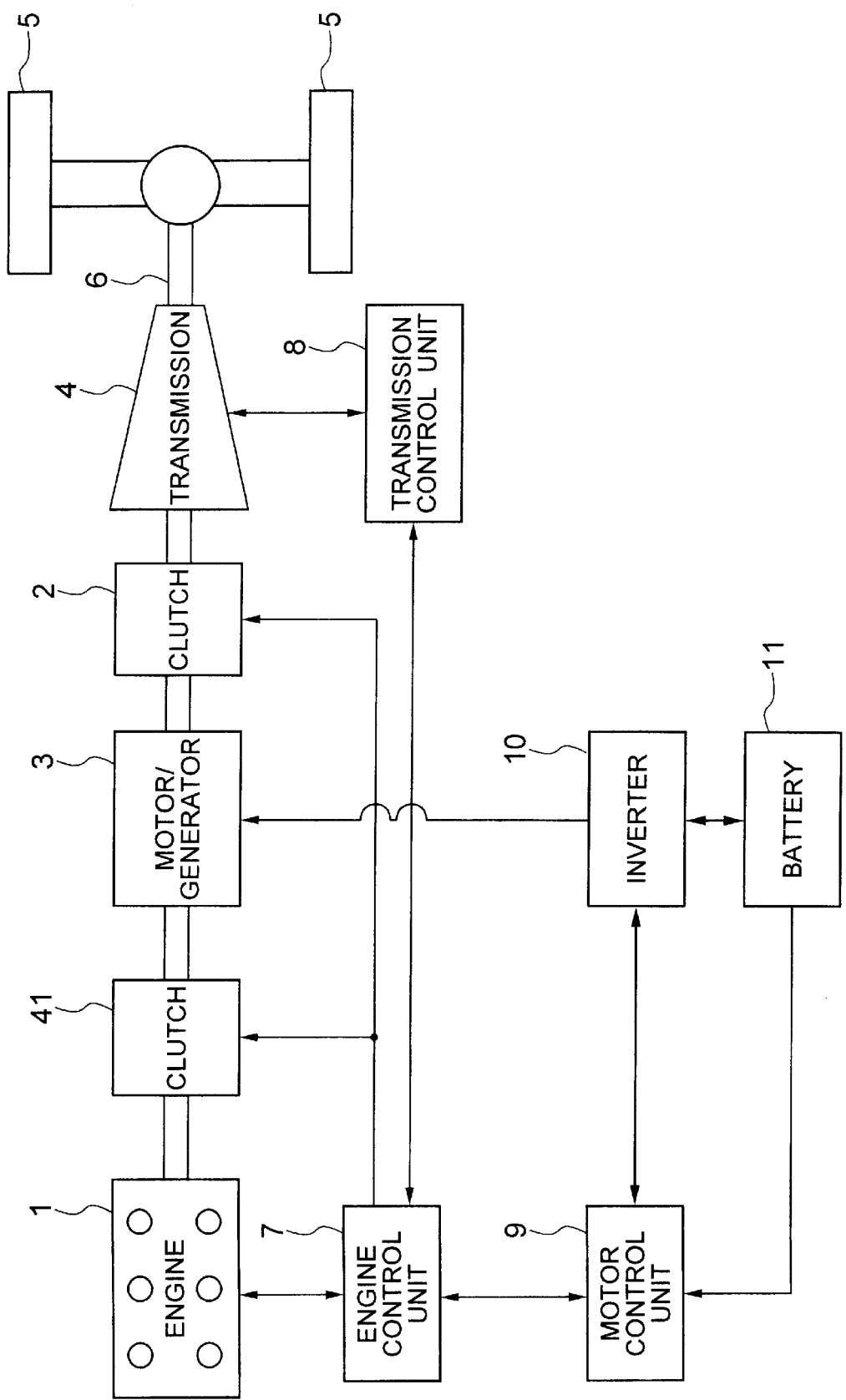
FIG. 20 is a system diagram showing a hybrid vehicle according to a third embodiment of the invention.

FIG. 20 is a system diagram showing a hybrid vehicle according to a third embodiment of the invention. As compared with the first and second embodiments, the position of the clutch 2 is different. This difference will be explained below.

Specifically, an electronically controlled clutch 41 is interposed between the engine 1 and the electric motor/generator 3, and another electronically controlled clutch 2 is interposed between the electric motor/generator 3 and the transmission 4. When the residual exhaust gas purification control permit flag fClean is set to 1, the clutch 41 is held in engagement whereas the clutch 2 is disengaged, or the clutch 2 is held in engagement whereas the clutch 41 is disengaged, thereby rotating the engine 1. The operation of purifying the residual exhaust gas using the clutch 41 is controlled in a similar way to that of the first embodiment, while the operation of purifying the residual exhaust gas using the clutch 2 is controlled in a similar to that of the second embodiment. Therefore, this control operation will not be described in detail.

(Fourth Embodiment)

Figure 21:
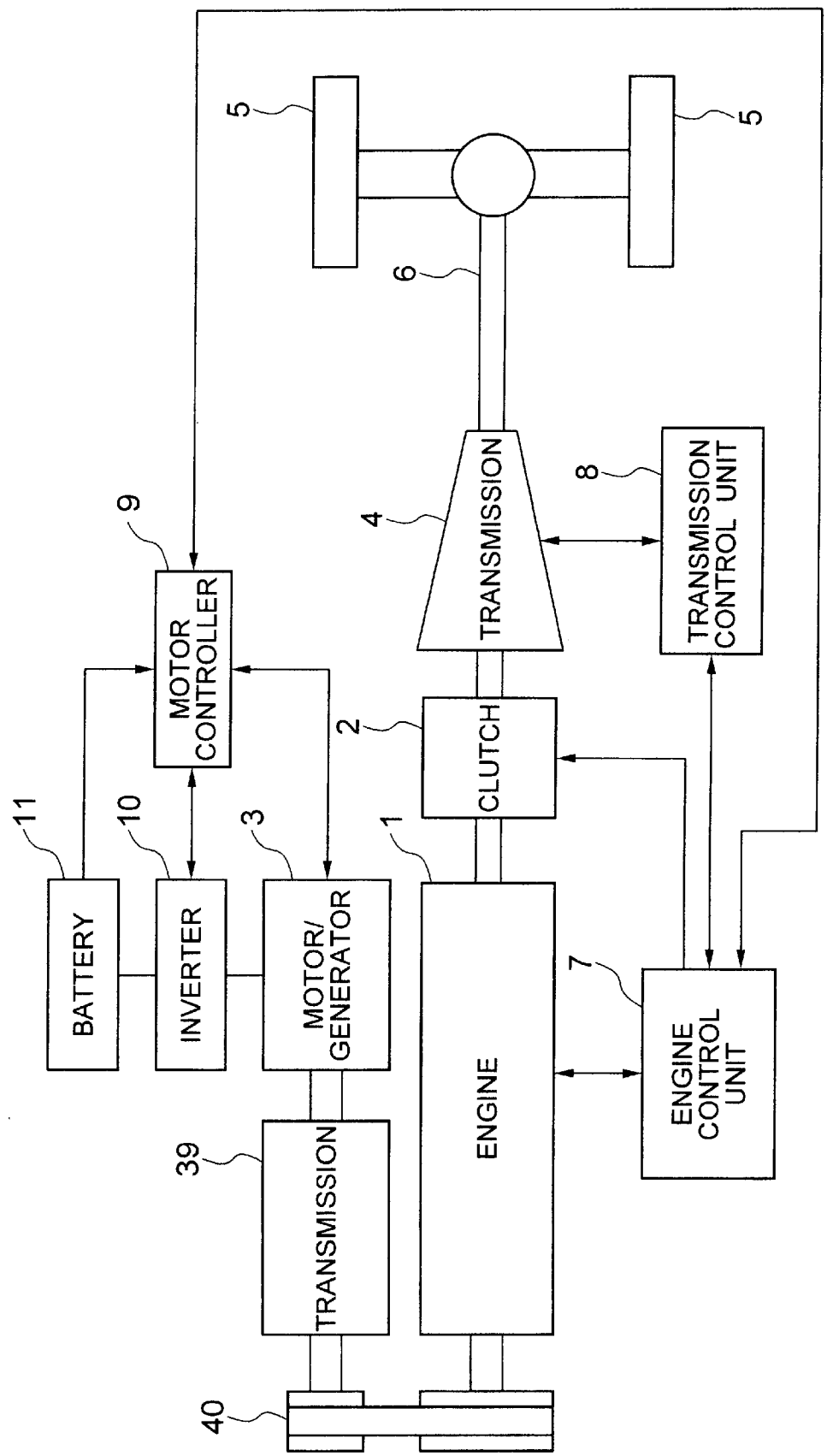
FIG. 21 is a system diagram showing a hybrid vehicle according to a fourth embodiment of the invention.

FIG. 21 is a system diagram showing a hybrid vehicle according to a fourth embodiment. This hybrid vehicle embodies the invention of claim 8. According to this embodiment, as compared with the first and second embodiments, the position of the clutch 2 is different, the other points remaining the same. The difference, therefore, will be explained.

Specifically, in this embodiment, the motor/generator 3 and the engine 1 are connected to each other through a transmission 39 and a pulley 40. The electric energy from the battery 11 is supplied through an inverter 10 to the motor/generator 3, and the force of the motor 3 is converted into an appropriate torque through the transmission 39 and transmitted to the engine 1 through the pulley 40. The torque of the engine 1 and the motor 3 is input to the transmission 4 through the axle 6.

Depending on the operating conditions, the force of the engine 1 is transmitted reversely to the motor/generator 3 through the pulley 40 and power is generated in the motor 3. The electric energy-thus generated is stored in the battery 11.

As described above, which of the two functions including the assistance with drive force and power generation is actually performed by the motor/generator 3 is controlled by the motor control unit 9 in accordance with the vehicle operating conditions. The operating conditions of the engine 1, on the other hand, are controlled by the engine control unit 7.

More specifically, with the vehicle according to this embodiment, the electric motor/generator 3, the engine 1, the transmission 4 and the axle 6 are connected in that order, and an electronically controlled clutch 2 is interposed between the engine 1 and the transmission 4. When the residual exhaust gas purification control permit flag fClean is set to 1, the clutch 2 is disengaged to rotate the engine 1. This method of controlling the residual exhaust gas purification is similar to that of the second embodiment, and therefore will not be specifically explained. When the vehicle is stationary, however, the clutch 2 interposed between the engine 1 and the transmission 4 is disengaged, and the engine 1 is rotated by the force of the motor 3 so that the residual gas is removed out of the engine 1 by scavenging and purified by the catalyst 21.

(Fifth Embodiment)

This embodiment represents the invention described in claim 10. More specifically, this embodiment concerns the control operation for optimizing the execution time of controlling the residual exhaust gas purification according to the first to fourth embodiments.

The execution time of controlling the residual exhaust gas purification is the period during which the engine 1 is run without any load. Thus, the time for sufficiently removing by scavenging and purifying the residual gas is calculated based on the operating conditions of the engine 1 or the motor 3. In this way, the residual gas is removed by scavenging and purified within a required minimum length of time.

Figure 22:
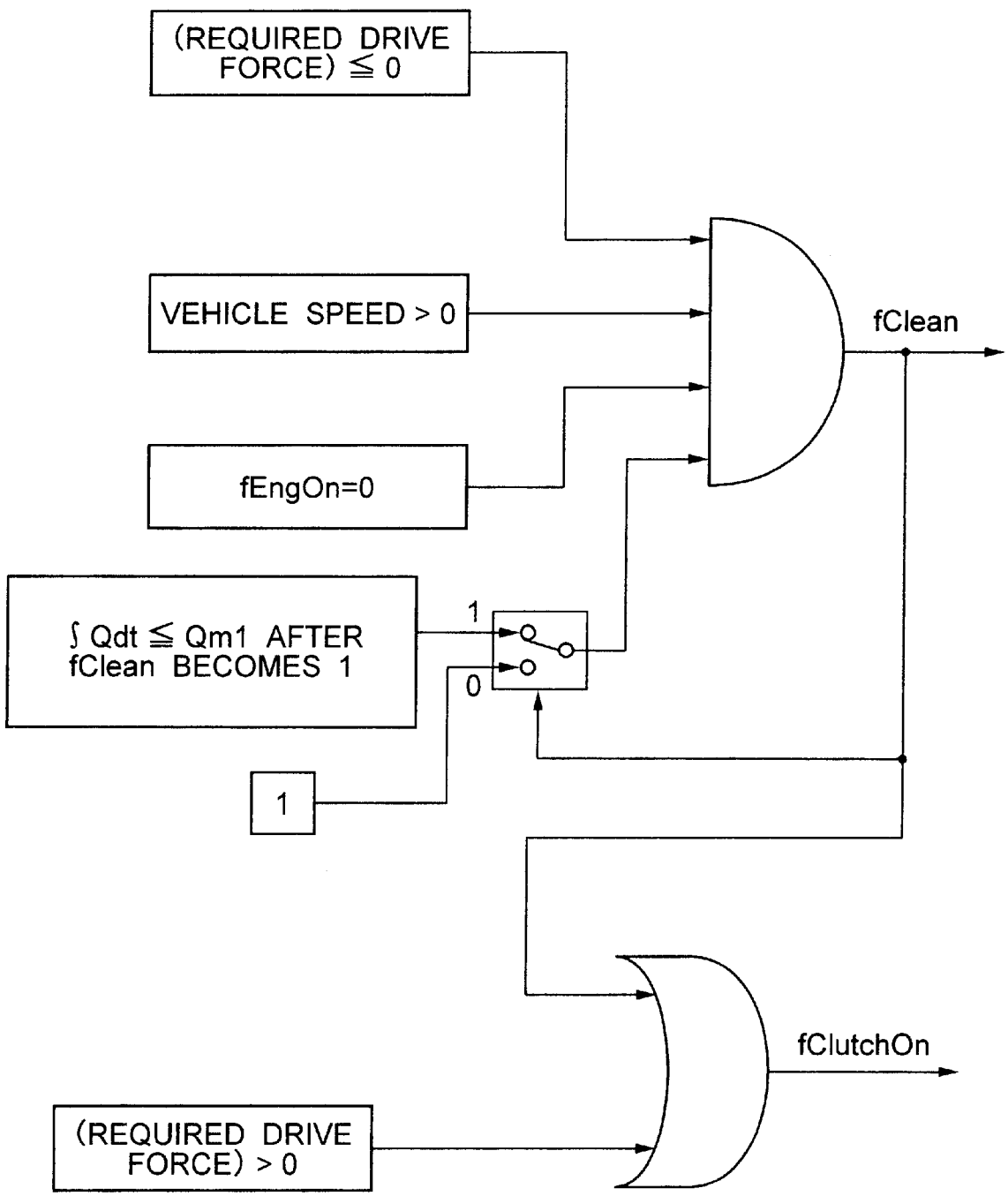
FIG. 22 is a block diagram showing the control operation for optimizing the time of controlling the residual exhaust gas purification according to a fifth embodiment of the invention, also applicable to the systems of the first to third embodiments.
Figure 23:
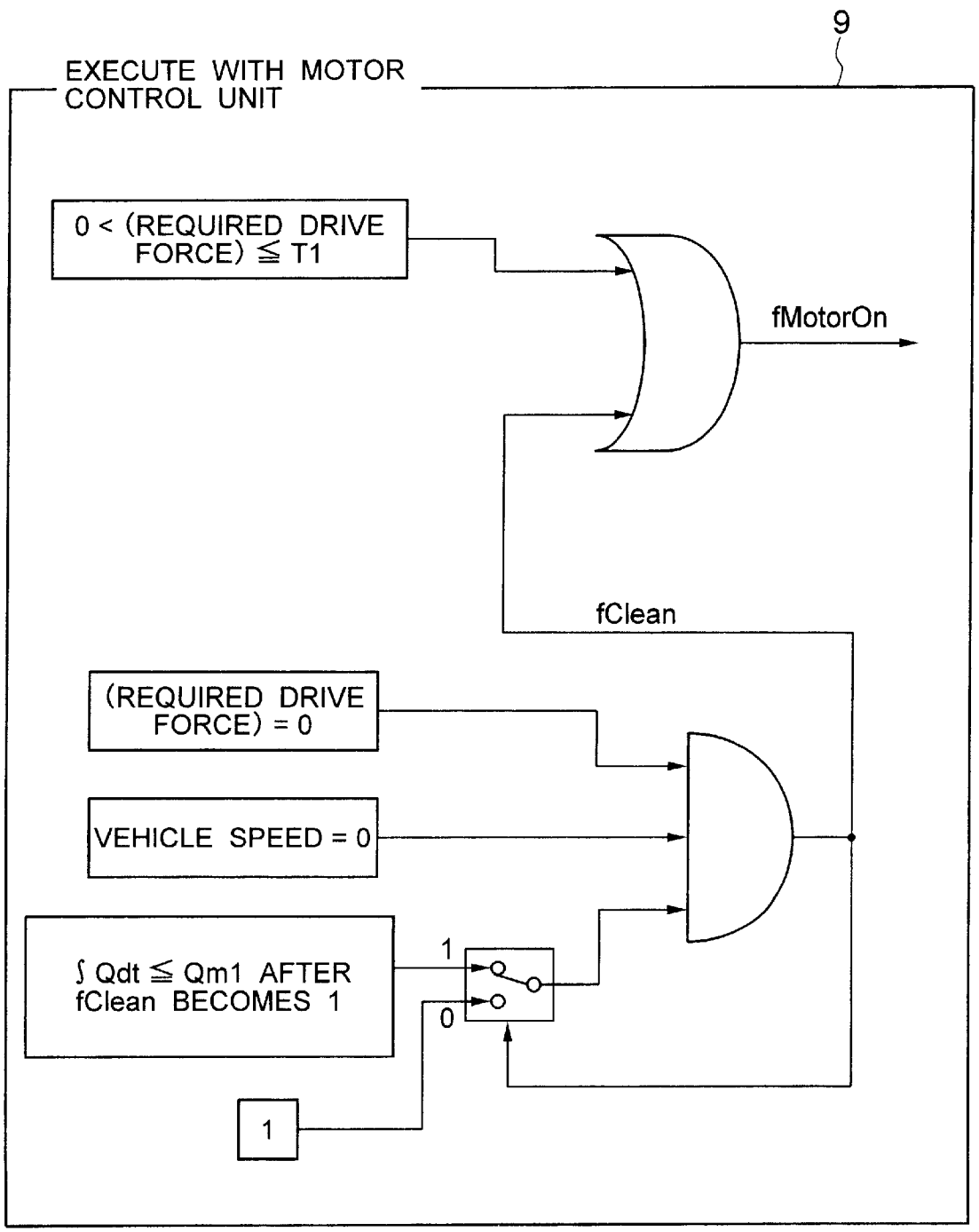
FIG. 23 is a block diagram showing the control operation for optimizing the time of controlling the residual exhaust gas purification according to a fifth embodiment of the invention, also applicable to the systems of the second, third and fourth embodiments.

FIGS. 22 and 23 show a method of calculating the residual exhaust gas purification control permit flag fClean in the residual exhaust gas purification means. The execution time of this operation is determined by the execution time calculation means arranged in the control unit.

In both FIGS. 22 and 23, the scavenging and the residual gas purification operation by the residual exhaust gas purification means is controlled after the residual exhaust gas purification control permit flag fClean becomes 1, which state is maintained as long as the integrated value of the engine influent air amount Q which is the amount of air flowing into the engine 1 is not more than Qm1. This control operation is executed in such a manner that in the case where the total amount of air that has flown into the engine 1 after the control operation starts exceeds the volume of the intake pipe 15, the cylinder 1a and the exhaust pipe 20, it is determined that the residual gas has been purified by scavenging. This residual exhaust gas purification control operation is continued, after starting it, until the exhaust gas remaining in the engine 1 has been sufficiently removed by scavenging. The value Qm1 may be determined by the test actually conducted on the vehicle.

The control method shown in FIG. 22 is applicable to the system of FIG. 9, and the control system shown in FIG. 23 is applicable to the system of FIGS. 16 and 21. Further, the system of FIG. 20 can be implemented by either of the systems of FIGS. 22 and 23.

(Sixth Embodiment)

This embodiment specifically represents the invention described in claim 11. More specifically, this embodiment concerns the control operation for optimizing the execution time of controlling the residual exhaust gas purification according to the first to fourth embodiments.

Figure 24:
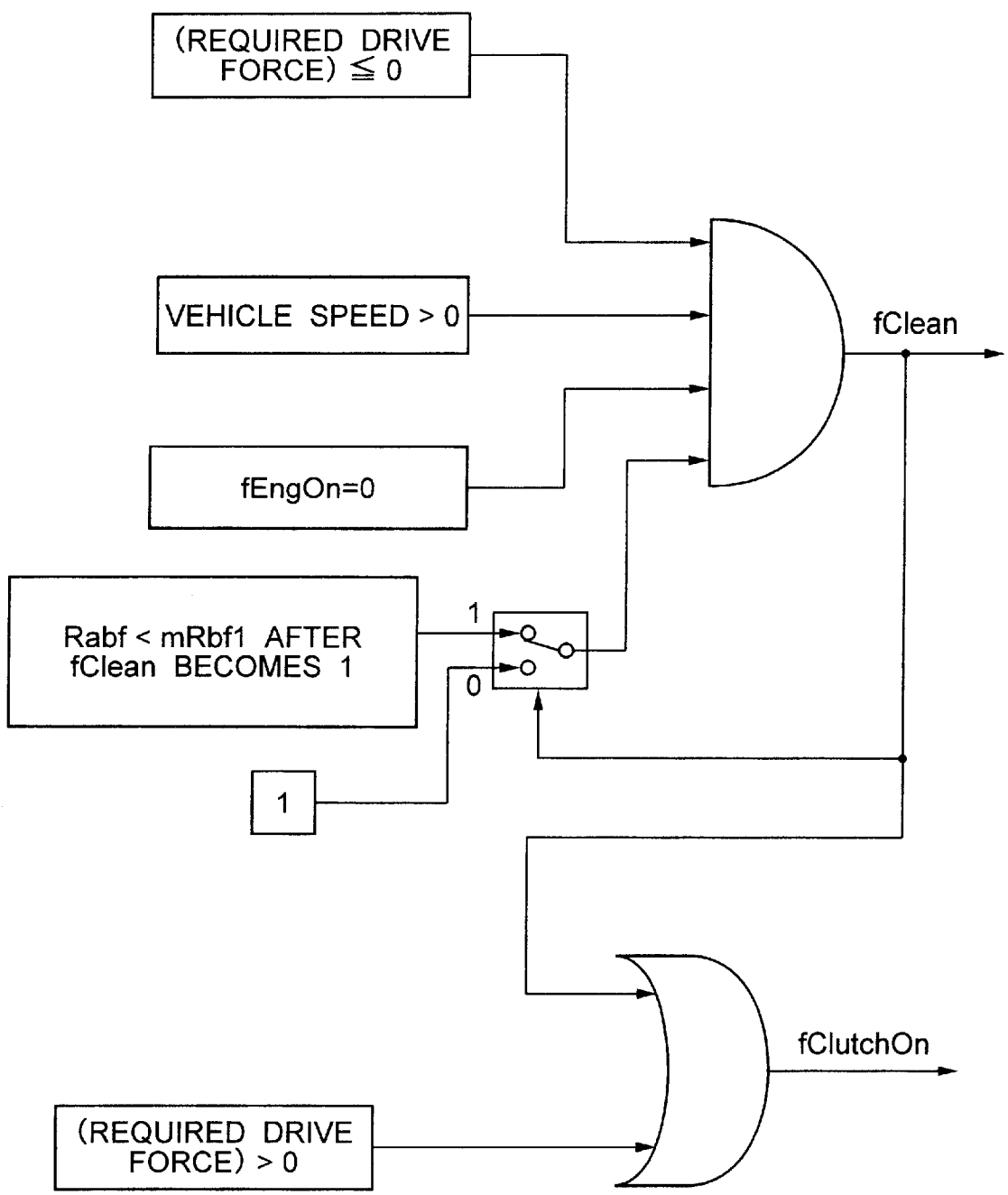
FIG. 24 is a block diagram showing the control operation for optimizing the time of controlling the residual exhaust gas purification according to a sixth embodiment of the invention, also applicable to the systems of the first and third embodiments.
Figure 25:
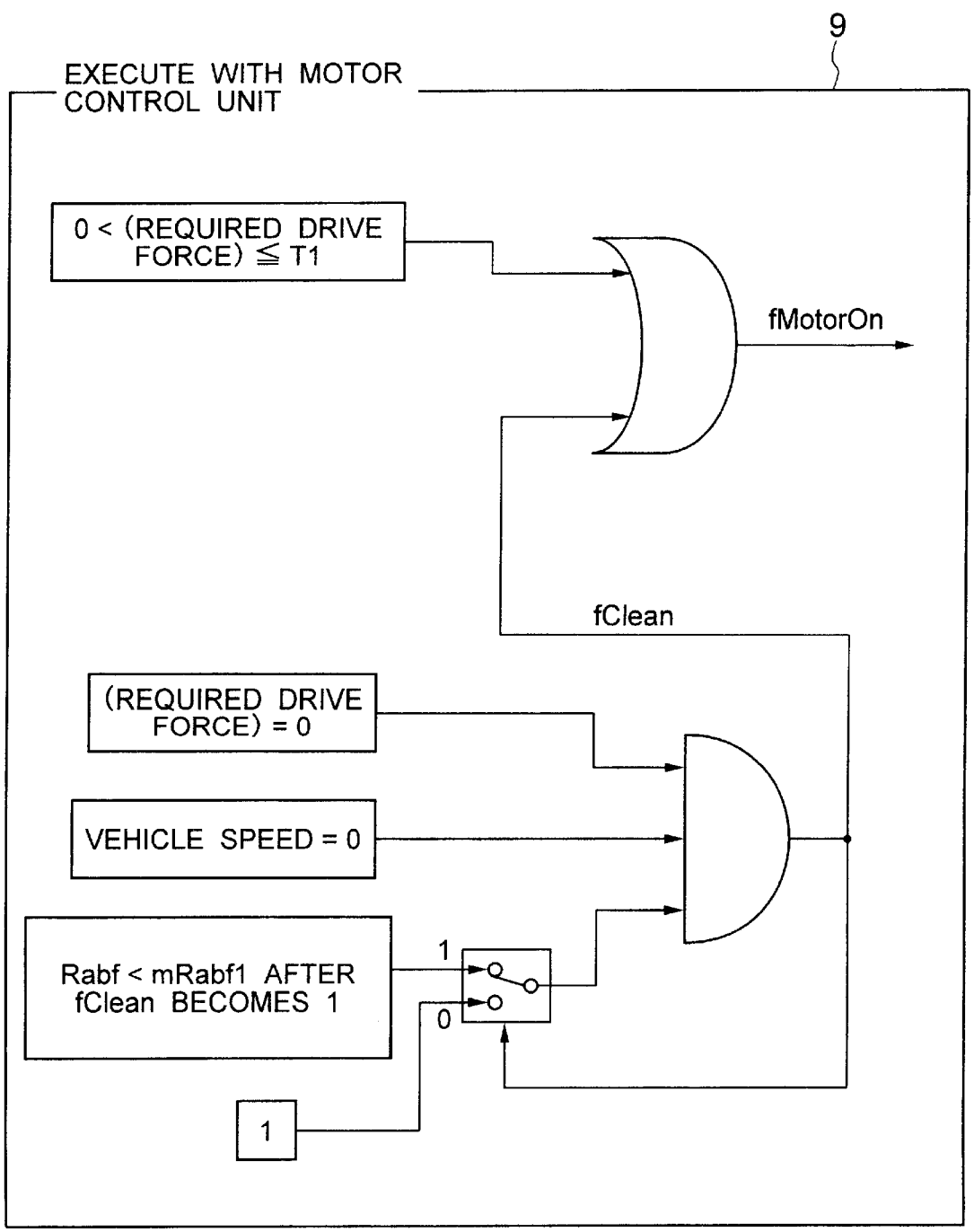
FIG. 25 is a block diagram showing the control operation for optimizing the time of controlling the residual exhaust gas purification according to the sixth embodiment of the invention, also applicable to the systems of the second, third and fourth embodiments.

FIGS. 24 and 25 show a method of calculating the residual exhaust gas purification control permit flag fClean in the residual exhaust gas purification means, and the execution time of this control operation is determined by the execution time calculation means in the control unit.

In both FIGS. 24 and 25, the control operation for purification by scavenging of the residual gas is executed after the residual exhaust gas purification control permit flag fClean is set to 1. As long as the output value Rabf of the A/F sensor 22 remains smaller than mRabf1, fClean is maintained at 1 and the residual exhaust gas purification control operation is executed. In the case where the oxygen component detected by the A/F sensor 22 becomes a value equal to the air after starting the control operation, for example, it is determined that the purification by scavenging of the residual exhaust gas have been completed. In the case where the exhaust gas remaining in the engine 1 has been sufficiently removed by scavenging after starting the residual exhaust gas purification control operation, the output of the A/F sensor 22 assumes a value associated with fresh air. The control operation thus is continued until the particular value is reached. The value mRabf1 can also be determined by a test conducted on an actual vehicle.

The control method shown in FIG. 24 is applicable to the system of FIG. 9, and the control method shown in FIG. 25 is applicable to the systems of FIGS. 16 and 21. Further, the system shown in FIG. 20 can be implemented by either of the systems shown in FIGS. 24 and 25.

(Seventh Embodiment)

This embodiment represents a specific case of the invention described in claim 12. More specifically, this embodiment concerns the control operation for optimizing the execution time of controlling the exhaust gas purification according to the first to fourth embodiments.

Figure 26:
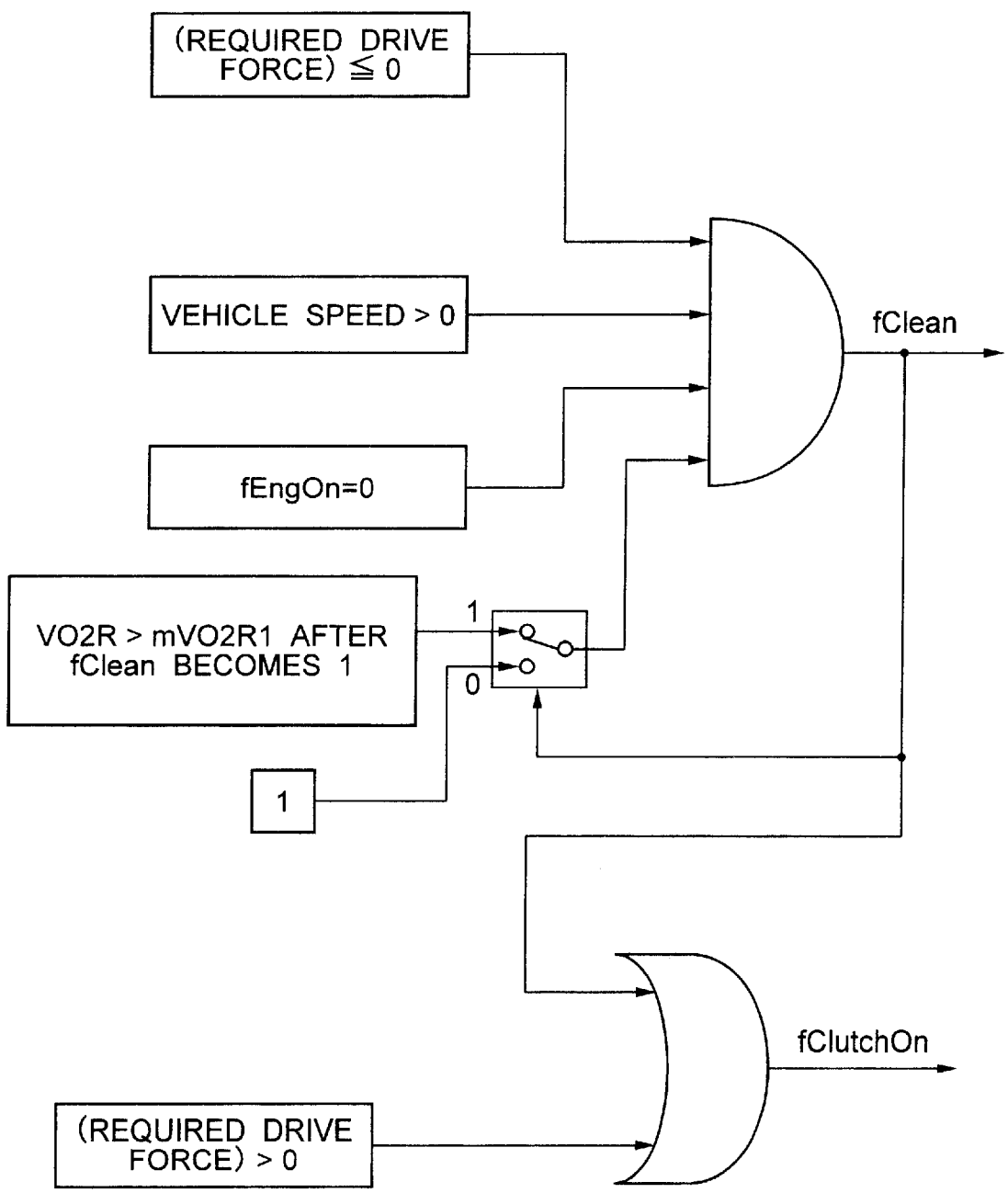
FIG. 26 is a block diagram showing the control operation for optimizing the time of controlling the residual exhaust gas purification according to a seventh embodiment of the invention, also applicable to the systems of the first and third embodiments.
Figure 27:
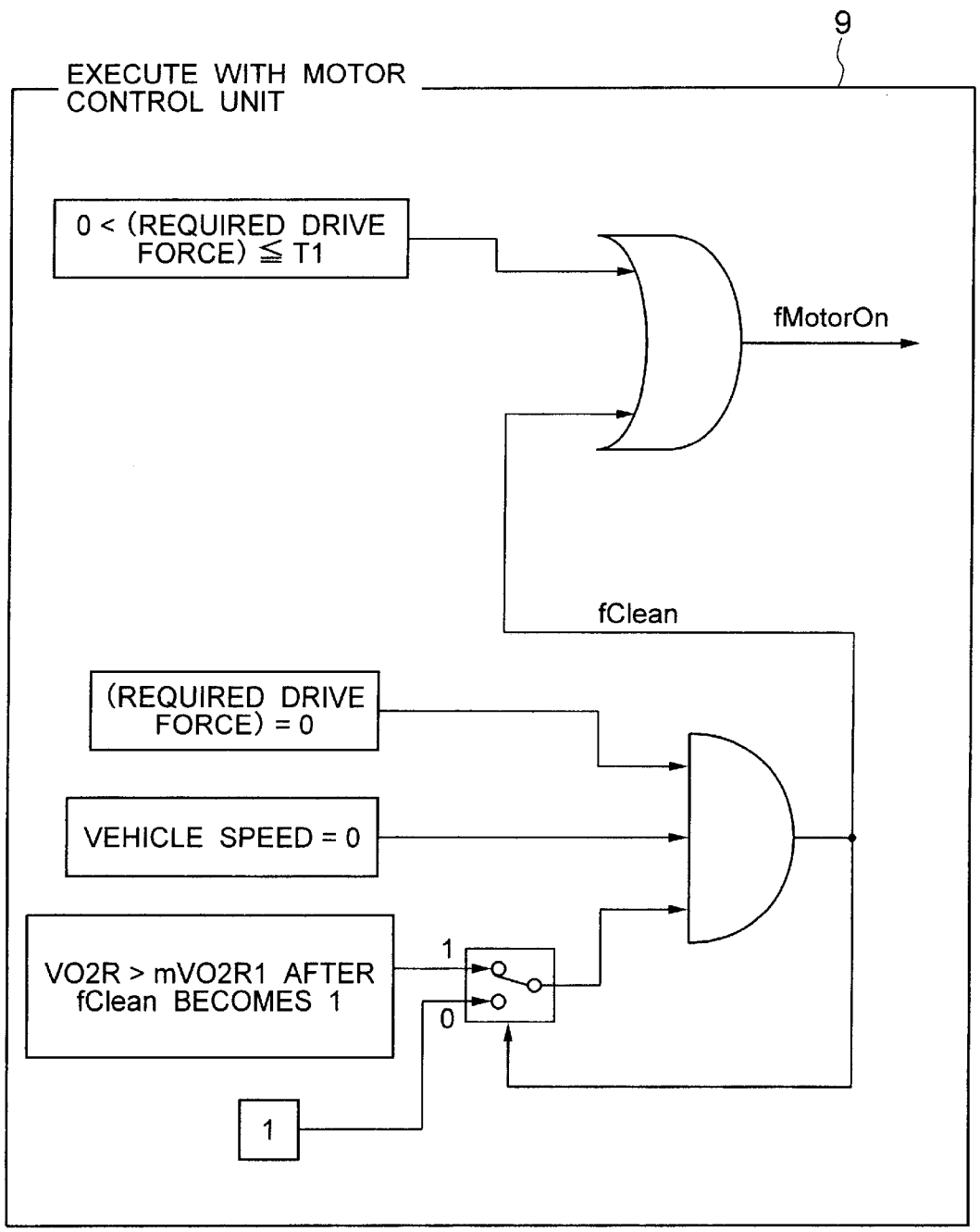
FIG. 27 is a block diagram showing the control operation for optimizing the time of controlling the residual exhaust gas purification according to the seventh embodiment of the invention, also applicable to the systems of the second, third and fourth embodiments.

FIGS. 26 and 27 show a method of calculating the residual exhaust gas purification control permit flag fclean in the residual exhaust gas purification means. The execution time of carrying out this method is determined by the execution time calculation means in the control units.

In both FIGS. 26 and 27, the control operation for purification by scavenging of the residual gas is performed after the residual exhaust gas purification control permit flag fClean is set to 1. As long as the output value VO2R of the O2 sensor 42 is larger than mVO2R1, fClean is maintained at 1 and the residual exhaust gas purification control operation is executed. In the case where the oxygen component detected by the O2 sensor 42 becomes a value equal to the air after starting the control operation, for example, it is determined that the purification by scavenging of the residual exhaust gas has been completed. In the case where the exhaust gas remaining in the engine 1 has been sufficiently removed by scavenging after starting the residual exhaust gas purification control operation, the output of the O2 sensor 42 assumes a value associated with fresh air. The control operation thus is continued until the particular value is reached. The value mVO2R1 can also be determined by a test conducted on an actual vehicle.

The control method shown in FIG. 26 is applicable to the system of FIG. 9, and the control method shown in FIG. 27 is applicable to the systems of FIGS. 16 and 21. Further, the system shown in FIG. 20 can be implemented by either of the systems shown in FIGS. 26 and 27. Further, in combination with the sixth embodiment, a control operation of higher accuracy can be executed.

(Eighth Embodiment)

This embodiment represents a specific case of the invention described in claim 13. More specifically, this embodiment concerns the operation of controlling the opening degree of the electronic throttle 14 during the period when the residual exhaust as purification is controlled according to the first o fourth embodiments.

Figure 28:
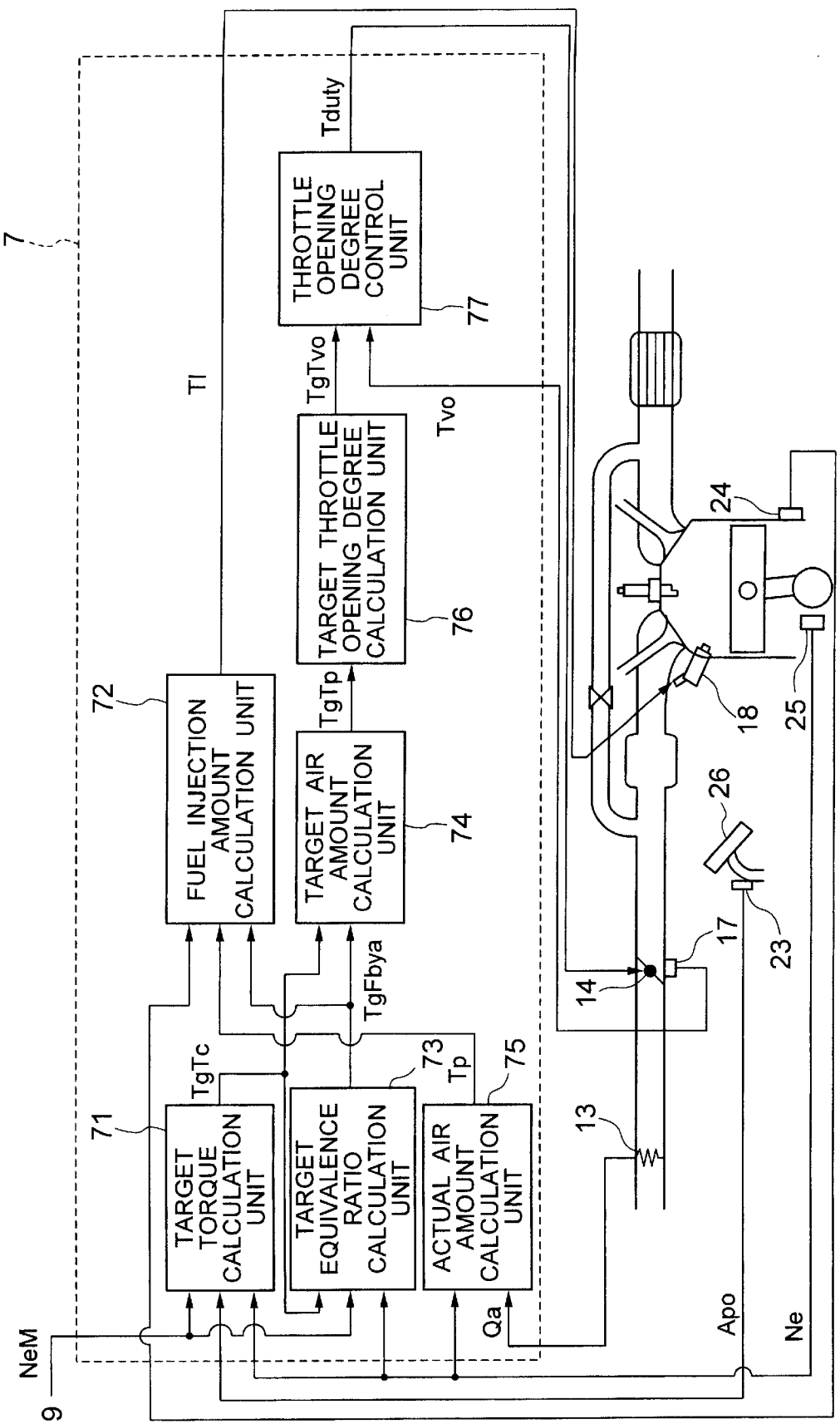
FIG. 28 is a block diagram showing the operation of controlling the whole engine according to an eighth embodiment of the invention.

FIG. 28 is a block diagram showing the whole of the engine torque control operation performed in a torque control configuration based on the operation performed with fuel first. This control system includes a target torque calculation unit 71, a fuel injection amount calculation unit 72, a target equivalence ratio calculation unit 73, a target air amount calculation unit 74, an actual air amount calculation unit 75, a target throttle opening degree calculation unit 76 and a throttle opening degree control unit 77.

First, the target torque calculation unit 71 calculates a target torque TgTc from the motor speed NeM and the engine speed Ne, and the fuel injection amount calculation unit 72 calculates the fuel injection amount TI0 for realizing the target torque TgTc. The fuel injection amount TI0 is corrected in phase with the air in the cylinder 1a to obtain a corrected fuel injection amount TI.

The target equivalence calculation unit 73 calculates a target equivalence ratio TgFbya from the target torque TgTc and the starting target motor speed TgNe. The ratio between fuel and air is handled in the form of the equivalence ratio conveniently for calculation. The equivalence ratio can be replaced with the air-fuel ratio.

The target air amount calculation unit 74 calculates the target air amount TgTp from the fuel injection amount TI0 and the target equivalence ratio TgFbya. As described later, the target air amount TgTp is a standardized value of the amount of air flowing into each cylinder per cycle for convenience' sake.

In the actual air amount calculation unit 75, the air mass flow rate Qa detected by the air flow sensor 13 is output by being converted into the actual air amount Tp flowing into each cylinder per cycle on the same order as the target air amount TgTp.

The target throttle opening degree calculation unit 76 calculates the target throttle opening degree TgTvo based on the target air amount TgTp and the actual air amount Tp, and the throttle opening degree calculation unit 77 calculates the throttle operation amount Tduty from the target throttle opening degree TgTvo and the actual opening degree Tvo. The throttle operation amount Tduty represents the duty factor of the PWM signal input to the drive circuit for controlling the throttle motor drive current.

Figure 29:
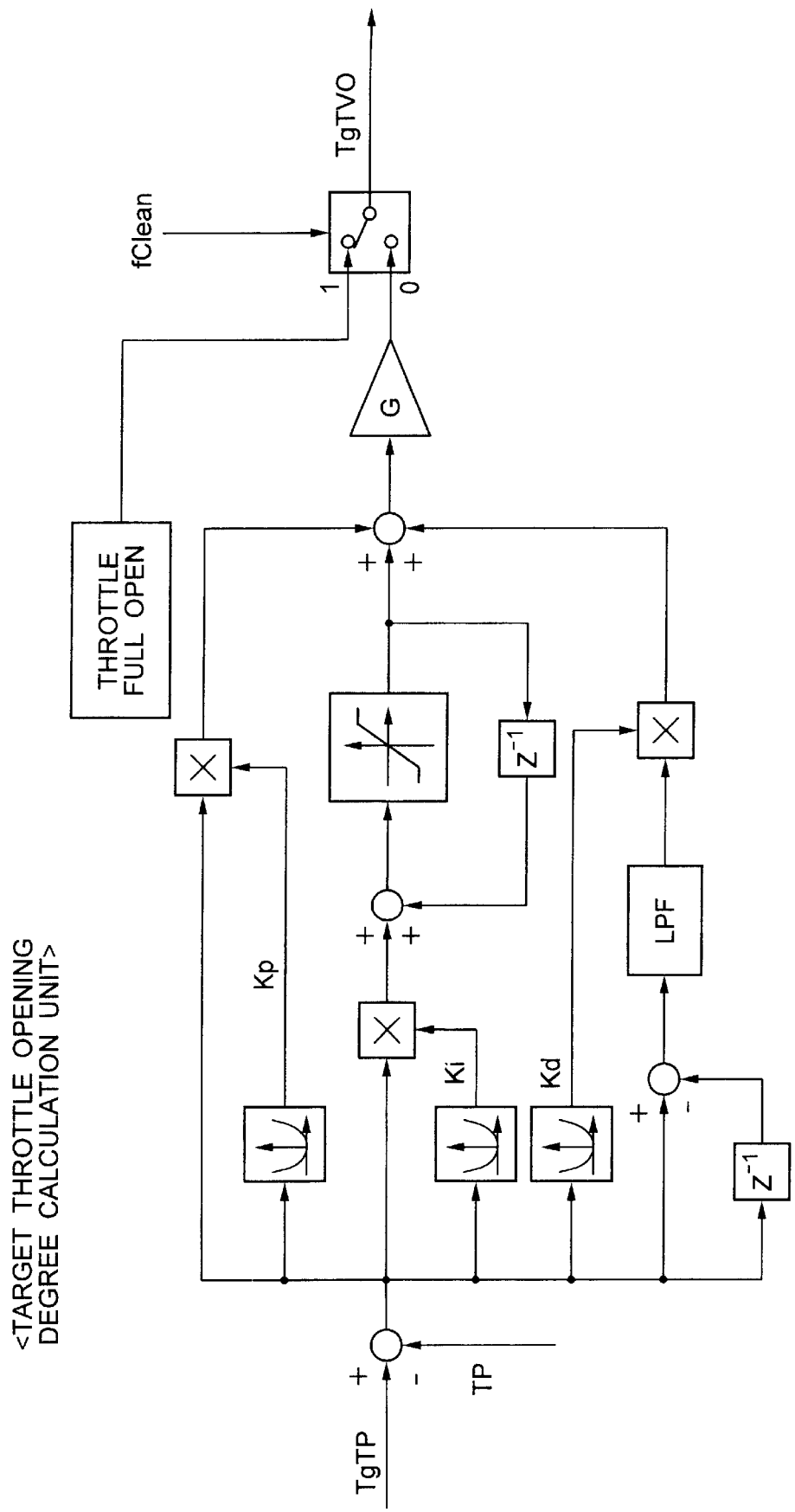
FIG. 29 is a block diagram showing a target throttle opening degree calculation unit according to the eighth embodiment of the invention shown in FIG. 28.

FIG. 29 is a block diagram showing the target throttle opening degree calculation unit 76 for determining the target throttle opening degree TgTvo from the target air amount TgTp and the actual air amount Tp by PID control. The target throttle opening degree is assumed to be a value associated with a full open throttle when the residual exhaust gas purification control permit flag fClean=1, i.e. during the execution of the operation of controlling the residual exhaust purification. By opening the electronic throttle 14 to the full during the execution period, the air amount flowing into the engine 1 can be maximized and thus the residual gas can be purified by scavenging within a short length of time. Also, the regeneration of the motor/generator 3, if carried out at the same time as the scavenging, can be more efficiently achieved by eliminating the intake loss of the engine 1.

(Ninth Embodiment)

This embodiment represents a specific case of the invention described in claim 14. More specifically, this embodiment concerns the operation of controlling the opening degree of the exhaust gas reflux amount regulation valve 28 during the residual exhaust gas control operation according to the first to fourth embodiments.

Figure 30:
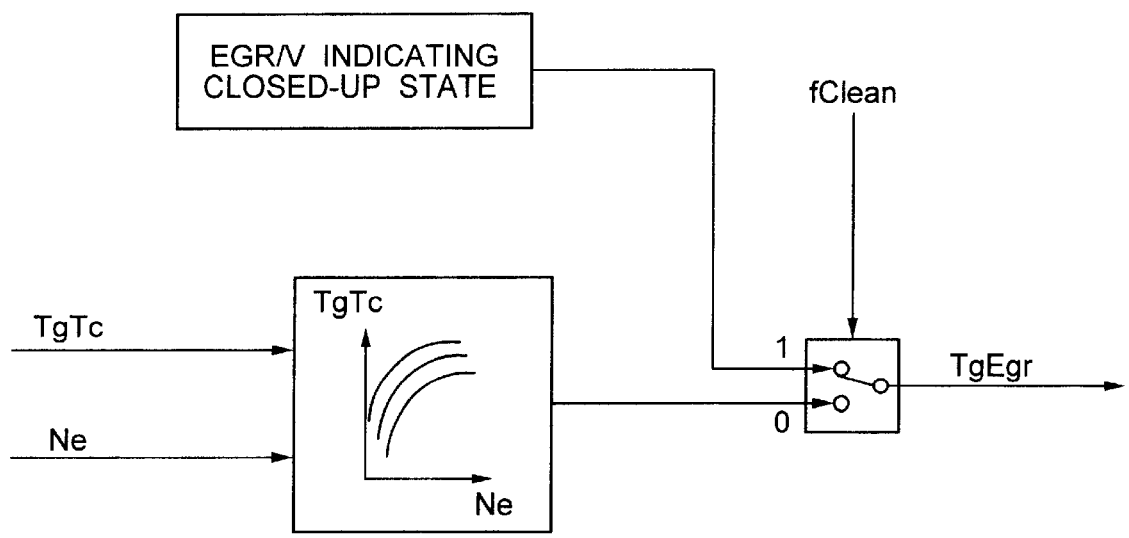
FIG. 30 is a block diagram showing a target EGR rate calculation unit according to a ninth embodiment of the invention.

FIG. 30 is a block diagram showing a target EGR rate calculation unit not shown in the engine control unit 7 for determining the target EGR rate EGR/V in terms of the opening degree TgEgr from the target torque TgTc and the engine speed Ne with reference to a map. In the case where the residual exhaust gas purification control permit flag fClean=1, i.e. during the operation of controlling the residual exhaust gas purification, the target EGR rate EGR/V is assumed to be associated with value for the valve 28 closed up. This method is employed by reason of the fact that by closing up the exhaust gas reflux flow rate regulation valve 28 during the execution period, the reflux of the residual gas can-be prevented and the residual gas can be purified by scavenging within a short length of time.

(Tenth Embodiment)

This embodiment represents a specific case of the invention described in claim 15. More specifically, this embodiment concerns the operation of controlling the throttle opening degree during the residual exhaust gas purification control operation according to the first to fourth embodiments, or especially the operation of controlling the motor speed according to the second to fourth embodiments.

Figure 31:
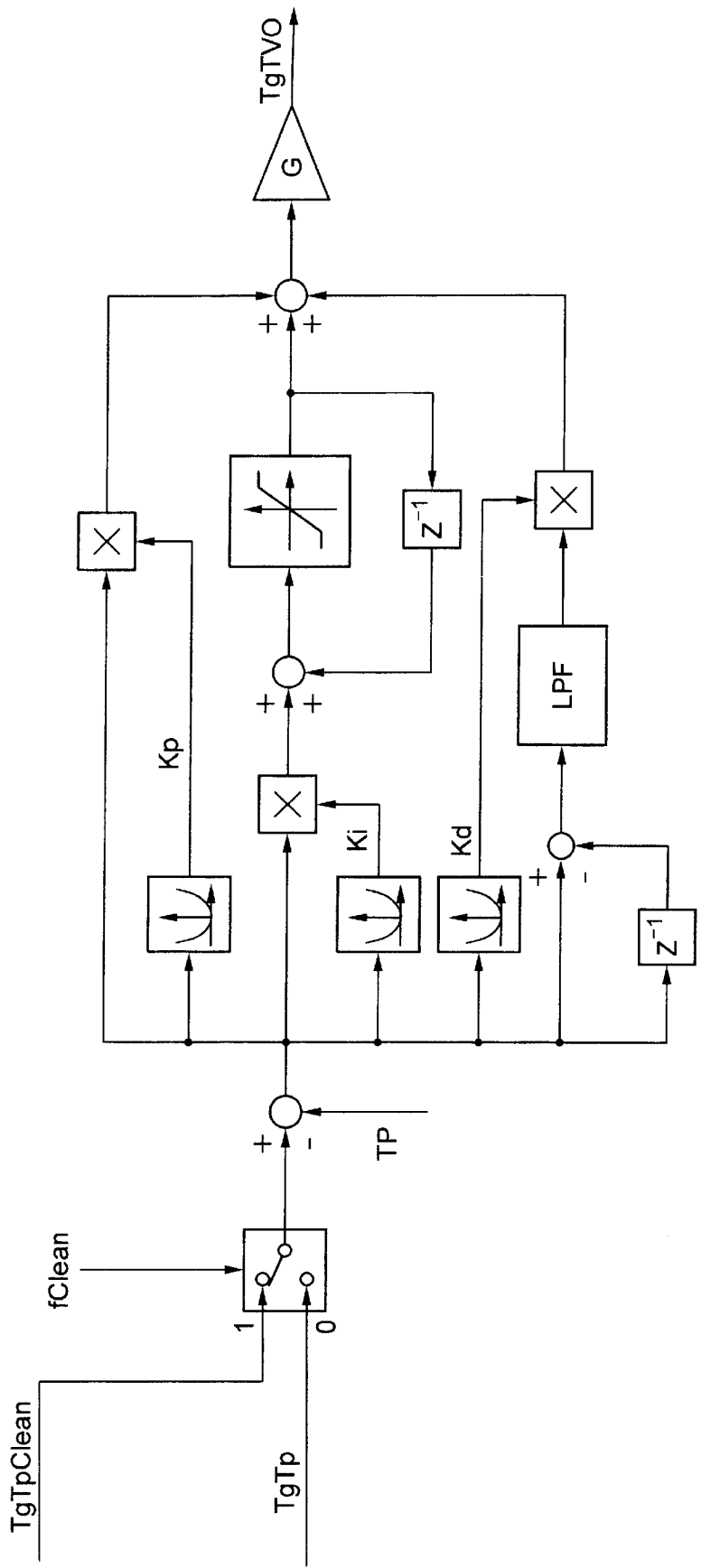
FIG. 31 is a block diagram showing a target throttle opening degree calculation unit according to a tenth embodiment of the invention.

FIG. 31 is a block diagram showing the target throttle opening degree calculation unit 76 for determining the target throttle opening degree TgTvo from the target air amount TgTp and the actual air amount Tp by PID control. In the case where the residual exhaust gas purification control permit flag fClean=1, i.e. during the operation of controlling the residual exhaust gas purification, the target air amount is set to TgTpClean associated with the highest purification efficiency of the catalyst 21.

Figure 32:
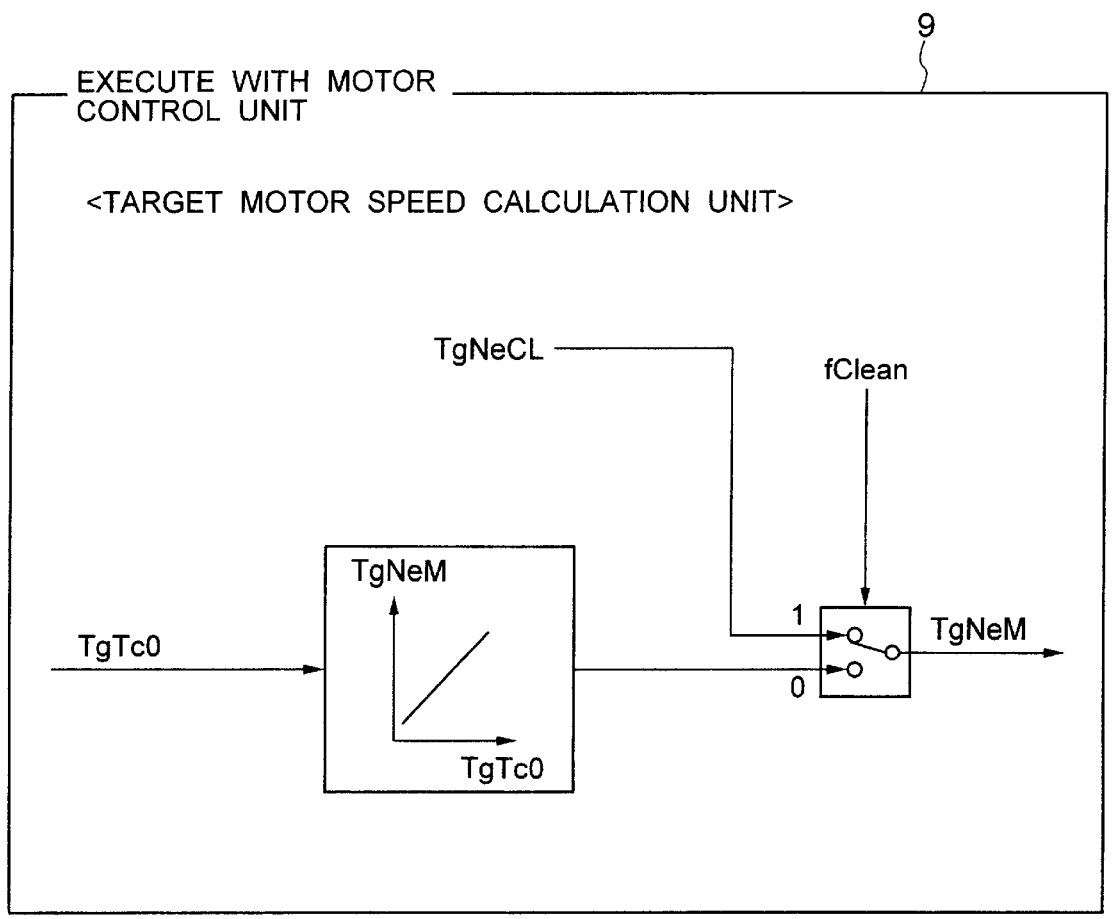
FIG. 32 is a block diagram showing a target motor rotational speed calculation unit according to the embodiment of FIG. 31.

FIG. 32 is a block diagram showing a target motor speed calculation unit not shown in the motor control unit 9 for determining the target motor speed TgNeM from the target drive force TgTcO with reference to a map. In the case where the residual exhaust gas purification control permit flag fClean=1, i.e. during the operation of controlling the residual exhaust gas purification, the target motor speed is set to TgNeM associated with the highest purification efficiency of the catalyst 21.

Specifically, the purification efficiency of the catalyst 21 is varied with the air flow rate per unit time (the speed at which air flows through the catalyst 21), and therefore, during the control operation of purification by scavenging of the residual gas at the time of vehicle deceleration, the air flow rate per unit time is controlled by the opening degree of the electronic throttle 14 and the engine speed (without load) in such a manner as to increase the purification efficiency of the catalyst 21. In this way, the exhaust gas can be purified highly efficiently. Incidentally, the values TgTpClean and TgNeM are desirably determined in accordance with the catalyst performance.

The control operation shown in FIG. 31 is applicable to all the systems of the first to fourth embodiments, and the control operation shown in FIG. 32 is applicable to the systems of the second to fourth embodiments.

(11th embodiment)

Figure 33:
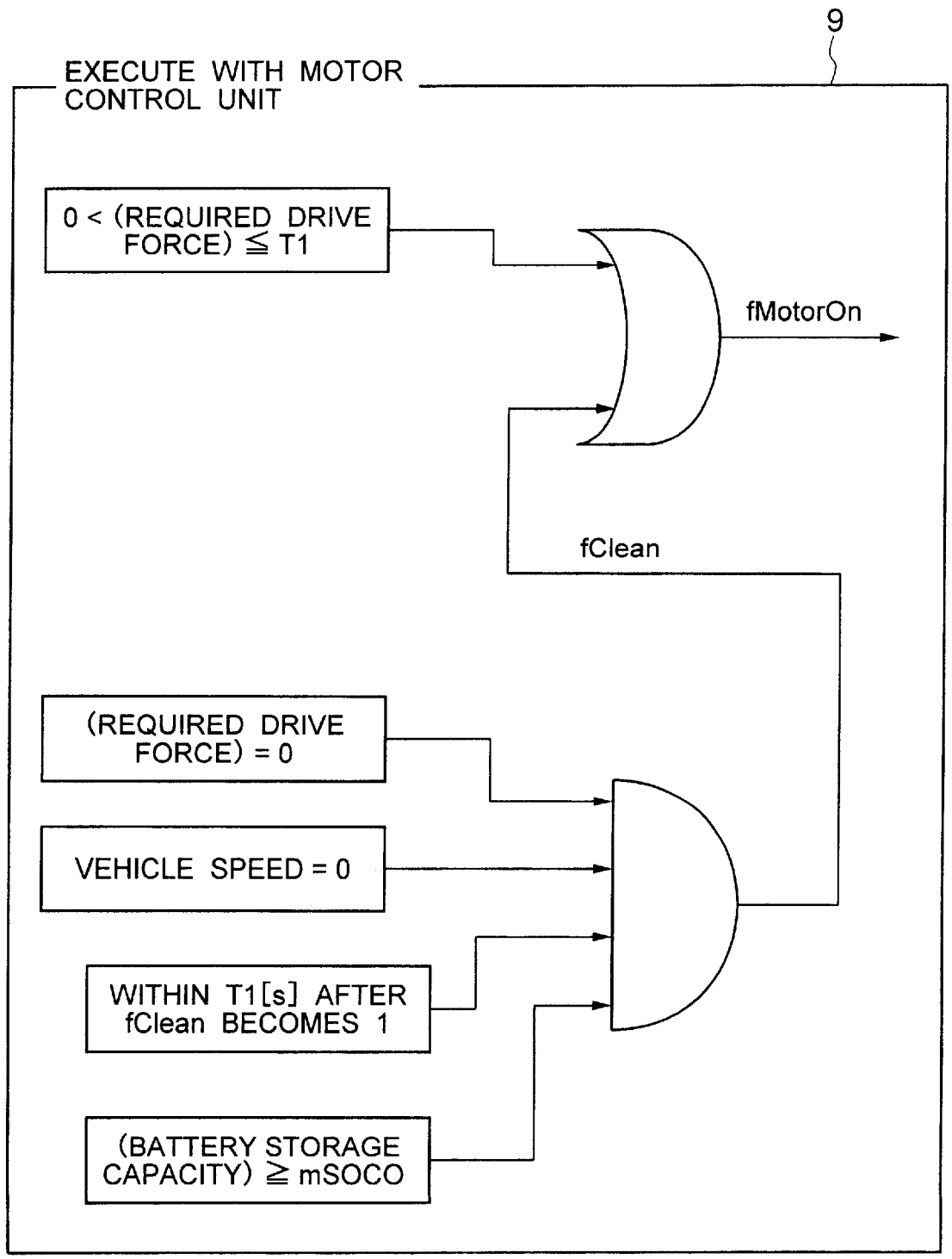
FIG. 33 is a block diagram showing the operation of controlling the purification of the residual exhaust gas and the motor drive permit control operation according to an 11th embodiment of the invention.

This embodiment represents a specific case of the invention described in claims 16 to 19. More specifically, this embodiment concerns the conditions for permitting the residual exhaust gas purification control operation by driving the motor according to the second to fourth embodiments FIG. 33 shows the process of the operation performed in the motor control unit 9. In the case where the required drive force is not less than 0 and not more than a predetermined value T1, or the residual exhaust gas purification control permit flag fClean=1, then the flag fMotorOn is set to 1 to drive the electric motor/generator 3. Preferably, the required drive force is normally determined to attain the optimum purification efficiency during the operation of controlling the accelerator pedal angle and the residual exhaust gas purification, i.e. when fClean=1.

The residual exhaust gas purification control permit flag fClean assumes 1 in the case where the required drive force is 0, the vehicle speed is 0, within time T1[s] after fClean becomes 1, and further the storage capacity of the battery 11 is not less than mSOCO.

Specifically, the purification efficiency of the catalyst 21 is varied with the air flow rate per unit time (the speed at which air flows through the catalyst 21), and therefore, during the control operation of the purification by scavenging of the residual gas carried out when the vehicle is stationary, the air flow rate per unit time is controlled by the opening degree of the electronic throttle 14 and the motor speed (engine speed) in such a manner as to improve the purification efficiency of the catalyst 21 and thereby to achieve a highly efficient purification of the exhaust gas.

In the case where the air flow rate per unit time is controlled by the electronic throttle 14 and the motor speed (engine speed) to improve the purification efficiency of the catalyst 21 as described above, the motor control unit 9 determines that the residual exhaust gas purification cannot be controlled by the motor operation and prohibits the particular residual gas purification control operation in the case where the residual capacity of the battery 11 is small, in view of the fact that the motor speed is determined in accordance with the storage capacity of the motor drive battery 11.

Figure 34:
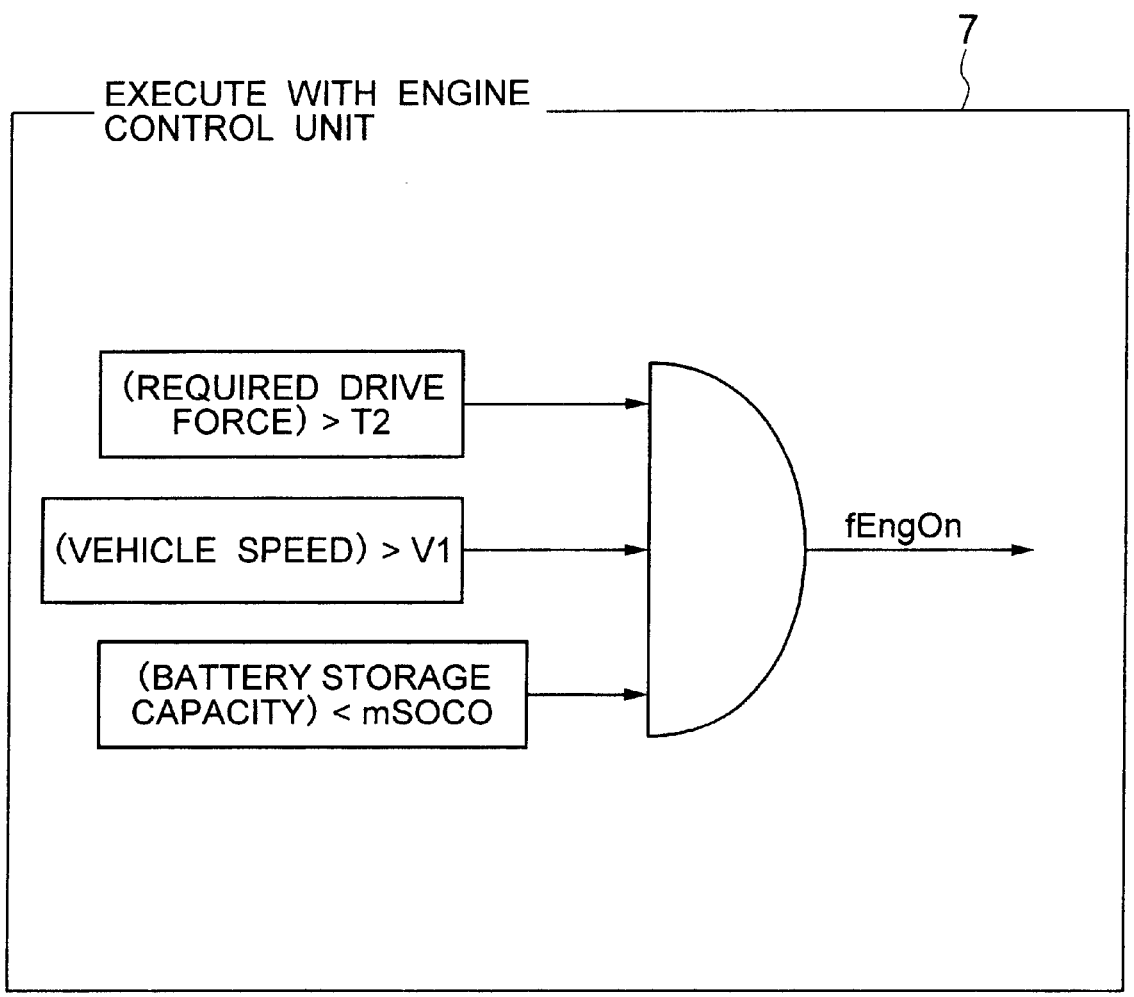
FIG. 34 is a block diagram showing the engine drive permit control operation according to the embodiment of FIG. 33.

FIG. 34 shows the process of the operation performed in the engine control unit 7. As described above, in the case where the residual capacity of the battery 11 is small, it is determined that the residual exhaust gas purification cannot be controlled by motor operation. Therefore, the engine stop during the idle stop is prohibited, and the generation of the residual exhaust gas is prevented by idling the engine 1.

The present invention is not limited to the embodiments described above, but the design thereof is modifiable variously without departing from the spirit and scope of the invention described in the appended claims.

It will thus be understood from the foregoing description that according to the present invention, there is provided a hybrid vehicle control apparatus in which the fuel injection to the engine is stopped before idle stop, and the engine is rotated by a drive source other than fuel combustion, thereby purifying the exhaust gas remaining in the engine intake pipe, cylinders, exhaust pipe and the catalyst. Thus, the deteriorated exhaust gas situation can be remarkably suppressed at the time of restarting the engine.

What is claimed is:

1. A hybrid vehicle control apparatus comprising a motive power source including an engine operated by fuel combustion and an electric motor/generator operated by electric energy, said apparatus further comprising residual exhaust gas purification means for purifying the gas remaining in an intake pipe, a plurality of cylinders, an exhaust pipe and a catalyst of said engine.

2. A hybrid vehicle control apparatus according to claim 1, further comprising accelerator pedal angle determining means for determining whether the accelerator pedal angle is not more than a predetermined value, wherein said residual exhaust gas purification means purifies the residual gas based on an output signal of said accelerator pedal angle determining means.

3. A hybrid vehicle control apparatus according to claim 1, further comprising engine revolution means for rotating said engine, wherein in the case where the fuel injection to said engine is stopped, said engine revolution means outputs a signal for rotating said engine by the force other than the explosive force of combustion, based on an output signal from said residual exhaust gas purification means.

4. A hybrid vehicle control apparatus according to claim 3, wherein said engine revolution means rotates said engine by the turning effort of said electric motor/generator.

5. A hybrid vehicle control apparatus according to claim 3, wherein said engine revolution means rotates said engine by the energy held by the vehicle axle required for deceleration.

6. A hybrid vehicle control apparatus according to claim 5, wherein said engine, said motor/generator, a transmission and an axle of said vehicle are connected in that order, a clutch is interposed between said engine and said motor/generator, and said engine revolution means rotates said engine by engaging said clutch for a predetermined length of time in the case where the required drive force of said vehicle is not more than 0 and said vehicle is decelerating.

7. A hybrid vehicle control apparatus according to claim 4, wherein said engine, said motor/generator, a transmission and an axle of said vehicle are connected in that order, a clutch is interposed at least between said motor/generator and said transmission, and said engine revolution means rotates said engine by disengaging said clutch in the case where said vehicle is stationary.

8. A hybrid vehicle control apparatus according to claim 4, wherein said motor/generator, said engine, a transmission and an axle of said vehicle are connected in that order, a clutch is interposed between said engine and said transmission, and said engine revolution means rotates said engine by disengaging said clutch in the case where said vehicle is stationary.

9. A hybrid vehicle control apparatus according to claim 1, further comprising execution time calculation means for calculating the execution time of controlling the purification of the residual gas by said residual exhaust gas purification means based on the operating conditions of selected one of said engine and said motor/generator.

10. A hybrid vehicle control apparatus according to claim 9, wherein said execution time calculation means calculates said execution time based on the amount of air flowing into said engine.

11. A hybrid vehicle control apparatus according to claim 9, wherein said engine includes catalyst upstream exhaust gas component detection means for detecting, directly or indirectly, the exhaust gas component upstream of said catalyst, and said execution time calculation means calculates said execution time based on the signal produced from said catalyst upstream exhaust gas component detection means.

12. A hybrid vehicle control apparatus according to claim 9, wherein said engine includes catalyst downstream exhaust gas component detection means for detecting, directly or indirectly, the exhaust gas component downstream of said catalyst, and said execution time calculation means calculates said execution time based on the signal produced from said catalyst downstream exhaust gas component detection means.

13. A hybrid vehicle control apparatus according to claim 1, wherein said engine includes a throttle valve for regulating the amount of air flowing into said engine, said control apparatus controlling said throttle valve to a full open state during the execution time of controlling the purification of the residual gas by said residual exhaust gas purification means.

14. A hybrid vehicle control apparatus according to claim 1, wherein said engine includes an exhaust gas reflux amount regulation valve for regulating the amount of the exhaust gas reflux in said engine, said control apparatus controlling said exhaust gas reflux amount regulation valve to a closed up state during the execution time of controlling the purification of the residual gas by said residual exhaust gas purification means.

15. A hybrid vehicle control apparatus according to claim 1, wherein said engine includes a throttle valve for regulating the amount of air flowing into said engine, said control apparatus controlling the opening degree of said throttle valve and the rotational speed of said motor/generator to maximize the purification efficiency of said catalyst during the execution time of controlling the purification of the residual gas by said residual exhaust gas purification means.

16. A hybrid vehicle control apparatus according to claim 5, wherein said engine includes a throttle valve for regulating the amount of air flowing into said engine, said control apparatus controlling the opening degree of said throttle valve to maximize the purification efficiency of said catalyst during the execution time of controlling the purification of the residual gas by said residual exhaust gas purification means.

17. A hybrid vehicle control apparatus according to claim 16, wherein said vehicle includes a battery for said motor/generator, said control apparatus determining the rotational speed of said motor/generator in accordance with the storage capacity of said battery.

18. A hybrid vehicle control apparatus according to claim 16, wherein said vehicle includes a battery for said motor/generator, said control apparatus prohibiting the operation of controlling the residual gas purification by said residual exhaust gas purification means in the case where said storage capacity of said battery is not more than a predetermined value.

19. A hybrid vehicle control apparatus according to claim 4, wherein said vehicle includes a battery for said motor/generator, said control apparatus being adapted to prohibit the idle stop of said engine and cause the engine to idle in the case where said storage capacity of said battery is not more than a predetermined value.

* * * * *